United States Patent
Struthers et al.

(10) Patent No.: US 7,378,188 B2
(45) Date of Patent: May 27, 2008

(54) STORAGE DEVICE AND METHOD FOR SORPTION AND DESORPTION OF MOLECULAR GAS CONTAINED BY STORAGE SITES OF NANO-FILAMENT LADED RETICULATED AEROGEL

(75) Inventors: Ralph C. Struthers, 1259 Jackie La., Santa Maria, CA (US) 93454; David B. Chang, 14212 Livingston Ave., Tustin, CA (US) 92780; Reza Toossi, Irvine, CA (US); Sion Ahdout, Los Angeles, CA (US); Lijuan Li, Diamond Bar, CA (US); Robert G. Palomba, 1640 Via Machado, Palos Verdes Estates, CA (US) 90274

(73) Assignees: EnerNext, LLC, Santa Monica, CA (US); Ralph C. Struthers, Santa Monica, CA (US); David B. Chang, Tustin, CA (US); Robert G. Palomba, Palos Verdes Estates, CA (US)

( * ) Notice: Subject to any disclaimer, the term of this patent is extended or adjusted under 35 U.S.C. 154(b) by 491 days.

(21) Appl. No.: 10/841,990

(22) Filed: May 7, 2004

(65) Prior Publication Data
US 2005/0061685 A1 Mar. 24, 2005

Related U.S. Application Data

(62) Division of application No. 10/666,663, filed on Sep. 18, 2003, now Pat. No. 6,906,003.

(51) Int. Cl.
*H01M 4/58* (2006.01)
*C01B 31/04* (2006.01)

(52) U.S. Cl. .................. 429/218.2; 429/209; 429/101; 420/900; 423/448; 423/460

(58) Field of Classification Search ............. 429/218.2, 429/209, 101; 420/900; 423/448, 460
See application file for complete search history.

(56) References Cited

U.S. PATENT DOCUMENTS

| 2,093,454 | A | | 9/1937 | Kistler |
| 2,625,296 | A | | 1/1953 | Parr |
| 3,650,102 | A | | 3/1972 | Economy et al. |
| 4,610,863 | A | | 9/1986 | Tewari et al. |
| 4,997,804 | A | | 3/1991 | Pekala |
| 5,366,828 | A | * | 11/1994 | Struthers ................. 429/101 |
| 5,556,892 | A | | 9/1996 | Pekala |
| 5,653,951 | A | | 8/1997 | Rodriguez et al. |
| 5,686,031 | A | | 11/1997 | Coronado et al. |
| 5,744,510 | A | * | 4/1998 | Pekala ...................... 521/181 |
| 5,837,741 | A | | 11/1998 | Schwarz et al. |
| 6,090,861 | A | | 7/2000 | Mendenhall et al. |
| 6,159,538 | A | * | 12/2000 | Rodriguez et al. ..... 427/213.31 |

(Continued)

FOREIGN PATENT DOCUMENTS

JP 09-227571 * 9/1997

*Primary Examiner*—Ling-Sui Choi
(74) *Attorney, Agent, or Firm*—MacPherson Kwok; Chen & Heid LLP; Tom Chen

(57) ABSTRACT

An apparatus and method for sorption and desorption of molecular gas contained by storage sites of graphite nano-filaments randomly disposed in three-dimensional reticulated aerogel.

16 Claims, 10 Drawing Sheets

U.S. PATENT DOCUMENTS 6,432,866 B1 8/2002 Tennent et al.
7,118,611 B2 * 10/2006 Snow et al. .................. 75/255

2003/0012722 A1 1/2003 Liu

* cited by examiner

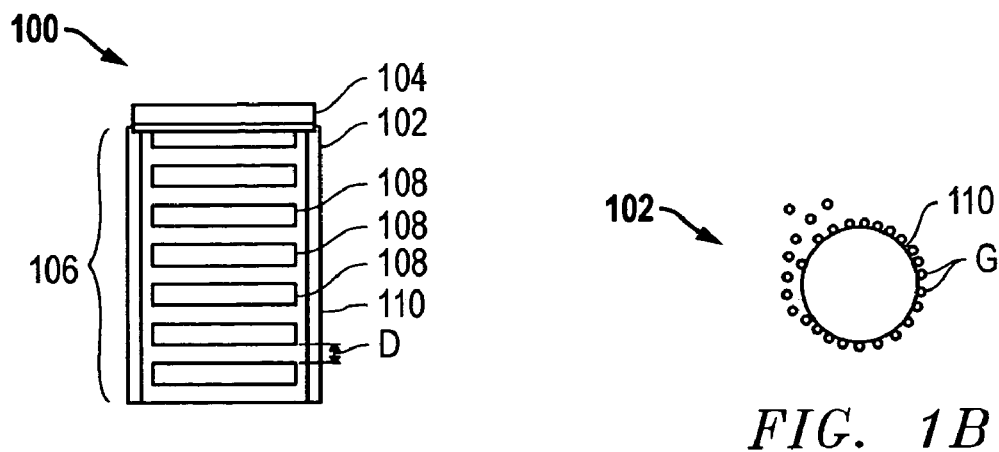
FIG. 1A
FIG. 1B
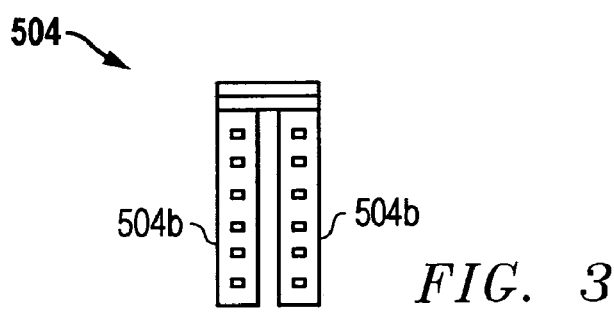
FIG. 3
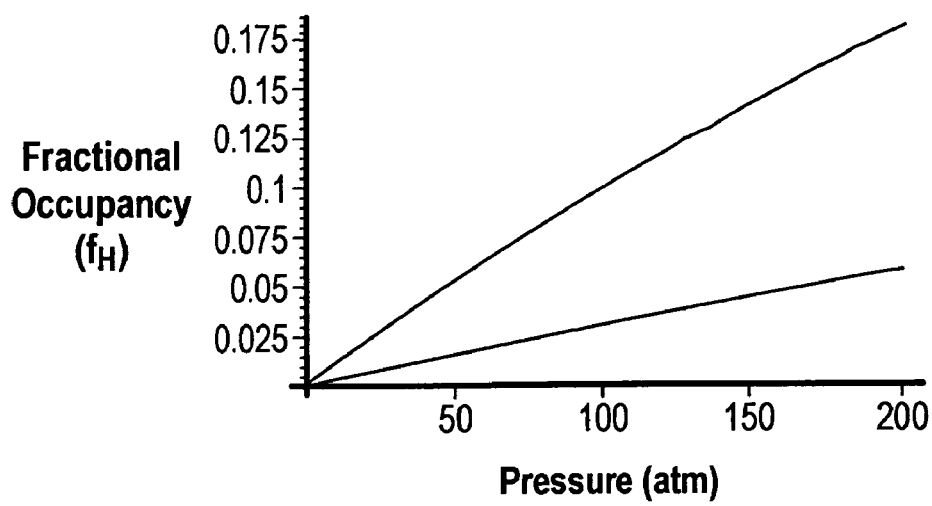
FIG. 2A

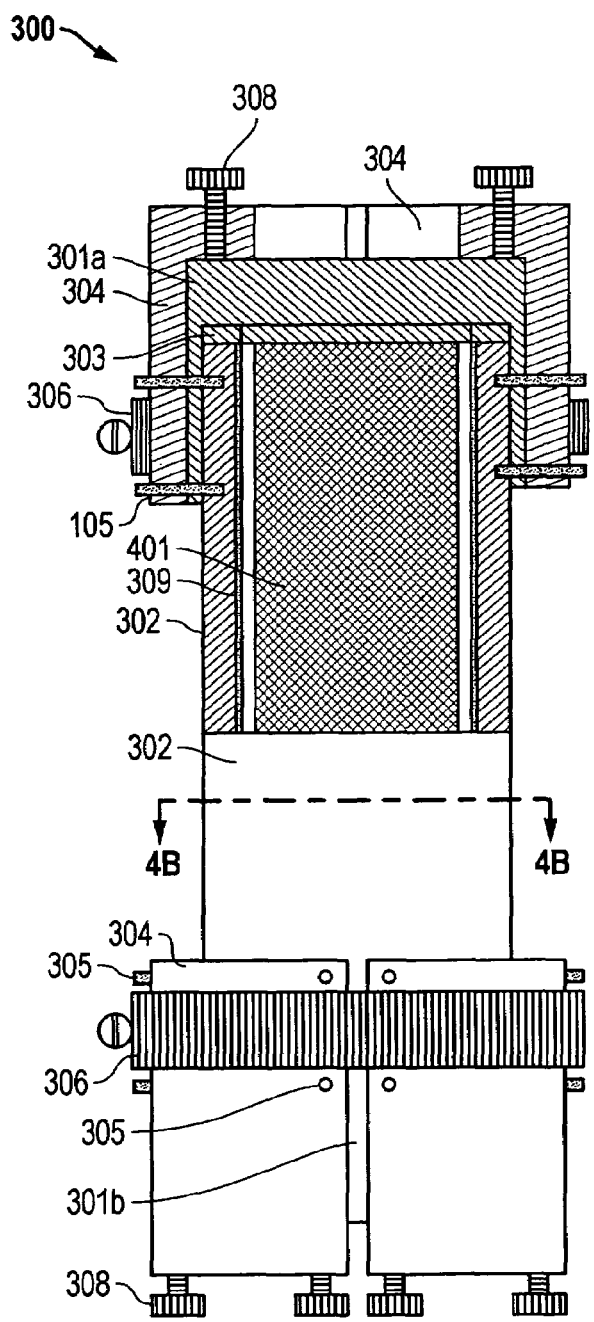
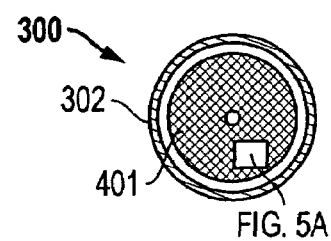
FIG. 4B
FIG. 4A

↑ ↑
Carbon Atoms Typ.

STORAGE DEVICE AND METHOD FOR SORPTION AND DESORPTION OF MOLECULAR GAS CONTAINED BY STORAGE SITES OF NANO-FILAMENT LADED RETICULATED AEROGEL

This application is a divisional of U.S. patent application Ser. No. 10/666,663, filed Sep. 18, 2003, now U.S. Pat No. 6,906,003 which is herein incorporated by references for all purposes.

BACKGROUND

1. Field of the Invention

The present invention relates to molecular gas storage, and more particularly to a method and apparatus for containing a molecular gas by sorption in storage sites of a nano-filament laded reticulated structure.

2. Related Art

Hydrogen has become progressively more attractive as an energy source as the price of petroleum increases and its availability declines. Hydrogen is particularly interesting as a fuel because it has the highest energy density per unit weight of any chemical fuel, and because hydrogen can be used directly in a variety of energy converters from reciprocating internal combustion engines to hydrogen fuel cells.

In the art of hydrogen fuel cells, there is an ongoing search for new and improved hydrogen power-generating cells and hydrogen storage systems. Power-generating cells may eventually replace other power generating systems, such as internal combustion engines. Improvements in hydrogen storage systems will make it possible to store enough hydrogen in small storage configurations to not only provide fuel to vehicles, but to one day provide power to cell phones, computers, camcorders and other cordless devices.

Unfortunately, hydrogen is a highly volatile fuel, and its storage in satisfactory quantities to be a commercially viable fuel has been a major obstacle to implementation of hydrogen-based energy systems.

Several methods of storing hydrogen currently exist, but are either inadequate or impractical for most consumer applications. For example, hydrogen can be stored in liquid form at very low temperatures. Cryogenic storage, however, only provides a volume density of 70 grams of hydrogen per liter, which is clearly insufficient for most consumer applications. In addition, the energy consumed in liquefying hydrogen gas is about 60% of the energy available from the resulting hydrogen.

Some hydrogen is stored under high pressure in cylinders. However, a 100-pound steel cylinder can only store about one pound of hydrogen at about 2200 psi, which translates into 1% by weight of hydrogen storage. More expensive composite cylinders with special compressors can store hydrogen at higher pressures of about 4,500 psi to achieve a more favorable storage ratio of about 4% by weight. Although even higher pressures are possible, safety factors and the high amount of energy consumed in achieving such high pressures have compelled a search for alternative hydrogen storage technologies that are both safe and efficient.

In view of the above, there is a need for safer, more effective methods of storing and recovering hydrogen.

SUMMARY

The present invention provides a method and apparatus for providing sorption of a molecular gas for storage. In accordance with the present invention, the molecular gas is constrained at storage sites provided as randomly disposed inter-engaged nanostructures in a three-dimensional reticulate. The nanostructure laded reticulate provides a high-density storage vehicle for storing significant quantities of molecular gas, such as hydrogen, for use as a fuel, such as in hydrogen fuel cells, which may provide power to vehicles or which may be used in a fixed power environment.

The high-density storage vehicle of the present invention provides a network of nano-filaments, such as carbon fibers, which can be grown on a polymeric structure. For example, the high-density storage device can include a carbon aerogel structure laden with graphite nano-filament storage sites, which can be used to contain significant quantities of molecular hydrogen. The advantage of such a system is the large potential surface area provided by both the nano-filaments and the supporting carbon aerogel for molecular gas sorption.

In one aspect of the invention, a method is provided for adsorption and desorption of molecular gas contained by storage sites of a graphite nano-filament laded reticulated aerogel structure of randomly disposed inter-engaged fibers. The method includes forming a catalyzed carbon aerogel monolith structure by preparing the sol-gel polymerization of one or more precursor mixtures. The sol-gel is supercritically dried to remove the liquid components, which forms a monolithic aerogel. The sol-gel mixture is then poured into a mold, sealed and cured. To reduce the metal salts to metal alloy catalyst precursors and carbonize the cured aerogel, the aerogel can be placed in a reducing atmosphere at elevated temperatures.

The catalyst, such as a metal ionic solution is deposited on the carbon aerogel to bond to carboxyl sites on the aerogel. In one aspect of the present invention, the decomposition of an effective amount carbon-containing gas mixture precursors on the catalyzed carbon aerogel structure at elevated temperatures, leads to the growing of crystalline graphite precursors, such as platelet carbon nano-fibers, cylindrical carbon nanostructures, ribbon carbon nano-fibers, faceted tubular carbon nano-fibers and herringbone carbon nano-fibers.

A gas, such as hydrogen is introduced into a pressure vessel which includes the nanostructure laded reticulate aerogel structure at suitable temperatures and pressures for sorption of the gas.

Advantageously, deposition of the desired metal catalysts can be increased by raising the solution temperature without fear of losing many of the bound metal ions to the solution. From statistical considerations, it can be shown that the most likely distribution of catalyst island sizes favors small island sizes. The island sizes within a typical size macropore (500 Angstroms) is favorable for the growth of small diameter nanostructures, such as nano-fibers and nano-tubes, with the large surface/mass ratios desired for hydrogen (or other gas) storage. In one aspect, a large surface/volume ratio is obtained when less than 50% of the possible aerogel area is occupied by the metal catalyst islands.

The values of the parameters determining storage capacity depend strongly on the van der Waals adsorption energy of hydrogen on the underlying nanostructure. The interaction of a hydrogen molecule, for example, with a carbon solid is found to depend on the plasma frequencies and natural oscillation frequencies of the graphite and of the hydrogen. At room temperature, appreciable fractional hydrogen occupancy is available on the graphite area, which requires pressures on the order of a hundred atmospheres. At liquid nitrogen temperatures, significant occupancy is achieved even at atmospheric pressure.

The mesocells in the aerogel can increase the available area by a factor of between about 60 and 70 times.

The aerogel/nanostructure system can provide a higher storage density than a typical pressurized storage system. For example, at room temperature, the factor is 10's of thousands. At liquid nitrogen temperature, the factor can exceed 100,000. At room temperature, a Department of Energy (DOE) target goal of 62 kg/m$^3$ is approached at storage pressures on the order of about 200 atmospheres. The DOE goal is met and even exceeded at atmospheric pressures at a liquid nitrogen temperature.

These and other features and advantages of the present invention will be more readily apparent from the detailed description of the preferred embodiments set forth below taken in conjunction with the accompanying drawings.

BRIEF DESCRIPTION OF THE DRAWINGS

FIG. 1A is a simplified view of a single nanostructure contained within a polymeric structure in accordance with an embodiment of the present invention;

FIG. 1B is a simplified view of a single nanostructure undergoing a sorption process in accordance with the principles of the present invention;

FIG. 2A illustrates a fractional occupancy $f_H$ of the surface storage sites by molecular hydrogen as a function of pressure at room temperature (300° K) in accordance with an embodiment of the present invention;

FIG. 3 is a simplified illustration showing an additional magnified partial view of FIG. 5D in accordance with an embodiment of the present invention;

FIG. 4A is a simplified view of a gas storage vessel for sorption and desorption of molecular gas in accordance with an embodiment of the present invention;

FIG. 4B is a sectional view taken substantially as indicated by line 4B-4B on FIG. 4A;

DETAILED DESCRIPTION

Figure 2B:
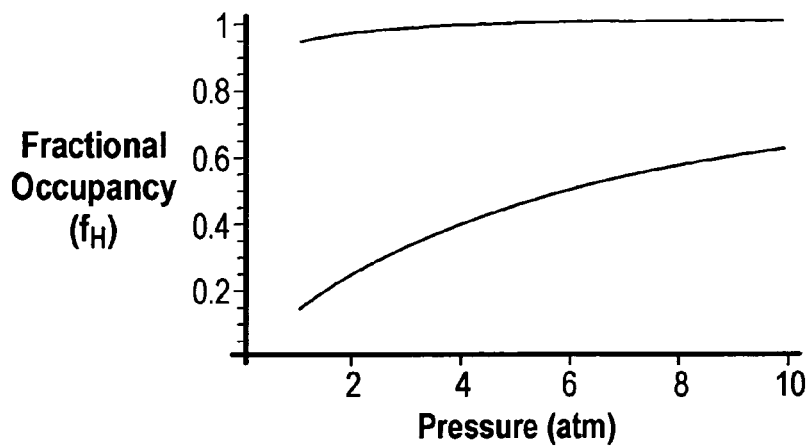
FIG. 2B illustrates a fractional occupancy $f_H$ of the surface storage sites by molecular hydrogen as a function of pressure at liquid nitrogen temperature (77° K) in accordance with an embodiment of the present invention.

The molecular gas storage system of the present invention includes nanostructures affixed or mounted on the surface area of a polymeric structure. Due to the large porosity of the polymeric structure, a large number of nanostructures can be packed into a given volume. Thus, as described in detail below, the large surface area created by the combination of the nanostructures and polymeric structure can be used to increase molecular gas storage capacity.

Although, the molecular gas storage system can be used to store different gases, such as hydrogen and oxygen, the embodiments described below are described using hydrogen, but with no intent to limit the invention to any particular gas. It should be understood that aerogels when supercritically dried, result in dry foams, thus, the terms "gel," "aerogel" and "foam" may be used interchangeably. As used herein polymeric structure can include gels, foams, aerogels and the like. As used herein nanostructures can include nano-filaments, nano-fibers, nano-tubes, nano-horns and the like.

FIG. 1A is a simplified view of a polymeric gel/nanostructure system 100. The polymeric gel/nanostructure 100 includes a nanostructure 102, such as a graphite nanofilament, contained within a polymeric structure 104, such as a foam or aerogel.

In one embodiment, polymeric structure 104 provides sites available for a catalyst, such as metal ions, to attach thereto and form catalyst islands on the surfaces of polymeric structure 104 from which the growth of nanostructure 102 is possible.

In one embodiment, nanostructure 102 includes a stack 106 of graphite platelets 108 of molecular dimensions. As shown in FIG. 1A, platelet stack 106 defines an outer cylindrical surface 110, which is capable of sorbing molecular gas in accordance with the principles of the present invention.

As shown in FIG. 1B, gas molecules G, such as hydrogen and oxygen, are adsorbed to outer cylindrical surface 110 of nanostructure 102. The amount of molecular gas G that can be stored at any particular temperature or pressure depends on the adsorption energy. As described below, the degree to which an adsorption site on nanostructure 102 can be occupied by a molecule of gas G is determined by an adsorption isotherm equation. For example, an equation of the Langmuir form is derived and applied to the adsorption of hydrogen in accordance with the principles of the present invention.

Polymeric Structure

A polymeric structure 104 can be made which exhibits a low density, continuous porosity and ultra fine cell size. In one embodiment, the process of creating polymeric structure 104 in accordance with the present invention includes mixing a phenolic substance, such as a polyhydroxy benzene, a diand tri-hydroxy benzene, or resorcinol (1,3-dihydroxy benzene) or mixtures of resorcinol and catechol or resorcinol and hydroquinone or resorcinol and phloroglucinol, with formaldehyde, in the presence of a base catalyst, such as sodium carbonate.

The reactants are heated to a temperature in the range of about 70° C. to about 100° C. to form a polymeric gel, which can then be placed in dilute acid to increase the cross-linking density of the polymeric gel.

The polymeric gel is then exchanged into a suitable organic solvent and supercritically dried with, for example, carbon-dioxide. The resulting aerogel may be further carbonized to yield a carbon aerogel.

Other reactant systems which form a gel before precipitating would be suitable for formation of aerogels by a condensation polymerization reaction, such as 1,3,5-trihydroxybenzene-formaldehyde, melamine-formaldehyde, ureaformaldehyde, and phenyldiamine-formaldehyde.

The resulting organic aerogel is a stable, transparent, low density gel, having densities in the range of between about 35 mg/cc to about 100 mg/cc. The aerogel can also be a uniform, microcellular structure or of ultrafine pore size. Other organic materials such as dihydroxy benzoic acids and other metal salts may also be incorporated into the aerogel to expand the range of its application. A representative description for the formation of low density, RF aerogels is disclosed in U.S. Pat. No. 4,997,804, which is incorporated herein by reference for all purposes.

Referring now to the exemplary embodiment of FIG. 1A, polymeric structure 104 can be formed from a basic solution of resorcinol and formaldehyde (RF), which allows the double bond between carbon and oxygen found in the formaldehyde to be broken, resulting in the formation of methylene bridges between the resorcinol molecules. In an alternative embodiment, a phenolic-furfural (PF) carbon aerogel can be used. The PF aerogel fabricates quickly by the elimination of the solvent exchange step.

Figure 5A:
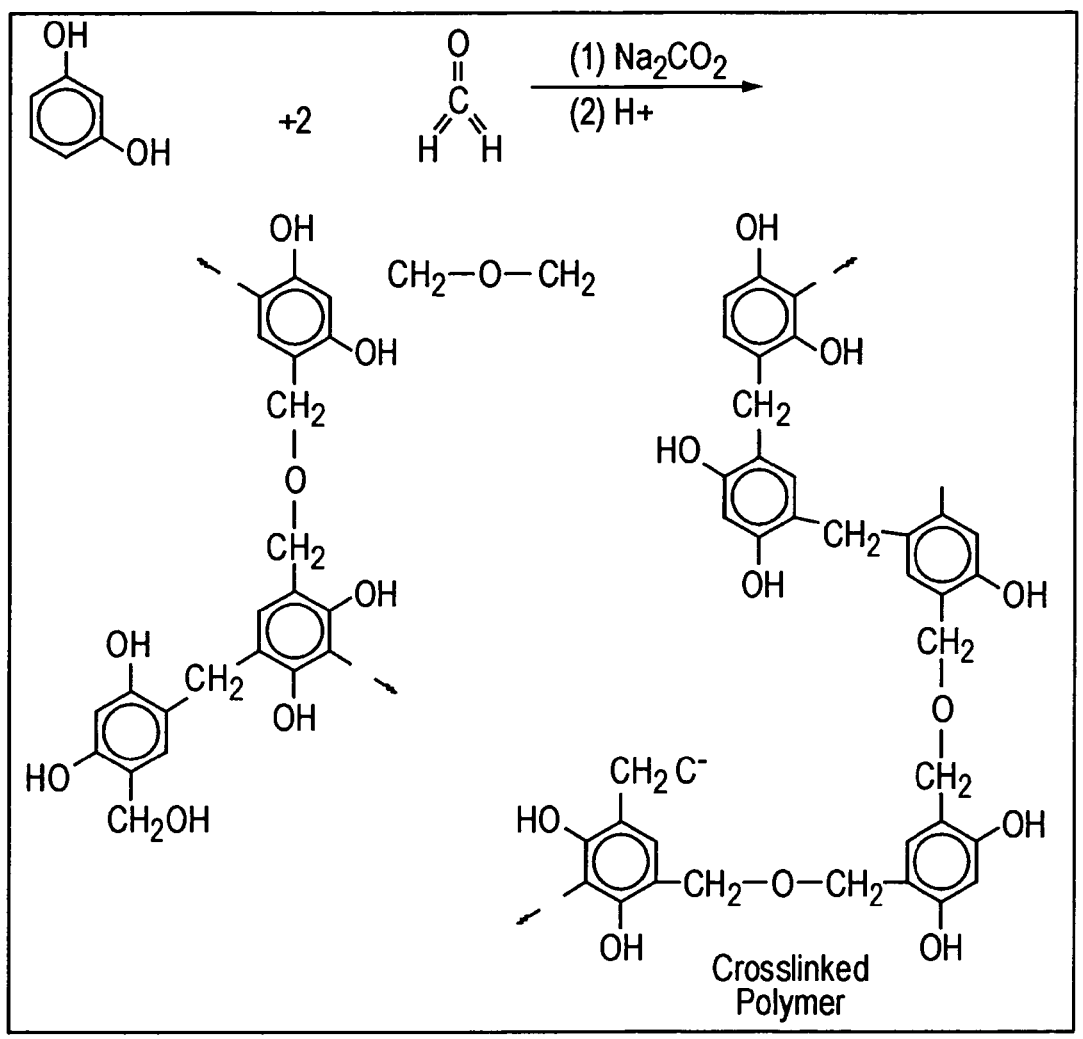
FIG. 5A is an illustration which shows the joining of a resorcinol molecule and a formaldehyde molecule primarily through a methylene bridge that results when the double bond holding oxygen to the carbon in formaldehyde is broken in the presence of a base solution in accordance with an embodiment of the present invention.

As shown in FIG. 5A, the resorcinol molecule in the polymer has two OH radicals hanging from its central benzene ring. These sites are negatively charged sites that are available sites for positively charged ions to attach to the polymer gel. As described in detail below, the sites are available for positively charged metal ions to attach to the polymer.

The basic building block of polymeric structure 104 can be viewed as a particle made of a tangled polymer web having an average diameter of about 100 Angstroms. The interconnected particles form open cells or pores with dimensions up to about 1000 Angstroms. As described below, the pore size can be tailored depending on the parameters of formation.

The pores created in polymeric structure 104 can be segregated into three different size scales, all of which can exist in the same structure. The first scale of pores, micropores, can range in size up to about 20 Angstroms. The next scale of pores, mesopores, can range in size between about 20 Angstroms and about 500 Angstroms. The final scale of pores, macropores can range in size from between about 500 Angstroms and about 1000 Angstroms. A macrocell is the volume defined by the intersection of two macropores. Similarly, a mesocell is the volume defined by the intersection of two mesopores.

Polymeric structure 104 provides a variety of physical properties, which may be tailored for each application. In one embodiment, polymeric structure 104 can be a carbon aerogel 104 formed having a density on the order of about 100 mg/cc, with a typical surface area in the range of between about 0.2 $m^2/gm$ and about 3000 $m^2/gm$. The density of aerogels can be decreased by increasing the process temperature, since this increases the number density of micropores and mesopores. The aerogel surface area per gram can be increased by elevating the process temperature and by decreasing the basic building block particle size.

Pore Sizes

Referring again to FIG. 5A, the resorcinol molecule and a formaldehyde molecule join together primarily through a methylene bridge that results when the double bond holding oxygen to the carbon in formaldehyde is broken in the presence of a base solution. The structure of the resorcinol unit in the resulting polymer includes a benzene ring in which two hydrogen molecules have been replaced by two OH molecules, resulting in the resorcinol having two carboxyl groups. It is known that the carboxyl group is electronegative. Accordingly, electrons from the benzene ring tend to spend more time in the vicinity of the carboxyl groups than in the rest of the ring. The result is the presence of a permanent electric dipole in the resorcinol.

The strength of the dipole p can be estimated from the electro-negativities of the benzene ring and of the OH molecules. As estimated using Pauling's relationship [Donald J. Royer, *Bonding Theory*. New York: McGraw-Hill, page192 (1968)], it can be shown that:

$$p/ed = 1 - (1/4)\exp[-(x_{Benzene} - x_{OH})^2]$$

where e is the electronic charge and d is the distance between the center of the benzene ring and the OH group. Although some hydroxymethyl bridges are formed, most of the bridges between the resorcinol molecules in the polymer are methylene bridges. The calculations are simplified by assuming in the following that all the bridges are methylene.

The distance between benzene rings can be estimated from the covalent radius of carbon to be about $R_C = 0.77$ Angstroms. Thus, the distance between the two outer rings of adjacent benzene rings is about $R = 4 R_C = 4 \times 0.77 = 3.08$ Angstroms and the distance between two carbons in the benzene ring is about $R_{CC} = 1.39$ Angstroms. Thus, the distance between centers of two adjacent resorcinol units is taken as:

$$R_{RR} = R_{CC} + 2R_{CC} \cos(\pi/3) + R$$
$$= 1.39 [1 + 2 \times 0.5] + 3.08$$
$$= 5.86 \text{ Angstroms}$$

This value is taken to be the step size, or link distance, for the polymer. This value also represents the distance between two adjacent dipoles in the polymer. The energy of interaction between two dipoles p(1) and p(2) separated by the distance vector r is:

$$U(r)=(1/r^3)[p(1)\cdot p(2)-3(p(1)\cdot r)(p(2)\cdot r)]$$

Referring to FIG. 5A, the different possible orientations of two adjacent dipoles can be represented by three different cases:
1. dipoles in the same plane and roughly aligned
2. dipoles in the same plane and anti-aligned
3. dipoles in perpendicular planes.

The interaction energies corresponding to the three possible cases are:

$$U(\text{case 1})=(p^2/R_{RR}^3)(\cos(\pi/3)+3\cos^2(\pi/6))=2.75\,(p^2/R_{RR}^3)$$

$$U(\text{case 2})=p^2/R_{RR}^3(-1+3\cos^2(\pi/3))=0.5(p^2/R_{RR}^3)$$

$$U(\text{case 3})=0$$

From the equations above it is noted that case 3 is the most energetically favorable case. Thus, the orientation of the alternate resorcinol molecules in perpendicular planes appears to be the most likely configuration. Note that for all three cases, the change in linkage angle is approximately $\pi/3$, since the bridge likes to form on a line joining the center of the benzene ring and the carbon taking part in the linkage.

The likelihood of cases 1, 2, or 3 occurring can be determined from the Boltzmann factor:

$$\text{Prob }(i)=\text{Statistical weight }(i)\times\exp(-U(i)/k_BT)/Z$$

where Z is the partition function:

$$Z=\Sigma \text{ Statistical weight }(i)\times\exp(-U(i)/k_BT)$$

Thus, $$Z=\exp[-(p^2/(R_{RR}^3 k_BT))2.75]+\exp[-(p^2/(R_{RR}^3 k_BT))0.5]+2$$

The likelihood of occurrence at a step for the different cases can be estimated as:

$$\text{Prob }(1)=(1/Z)\exp[-(p^2/(R_{RR}^3 k_BT))2.75]$$

$$\text{Prob }(2)=(1/Z)\exp[-(p^2/(R_{RR}^3 k_BT))0.5]$$

$$\text{Prob}(3)=(1/Z)\times 2.$$

For successive applications of case 3, the resulting situation appears like a random walk in three dimensions. For successive applications of case 2, on the other hand, the net direction of motion is a zig-zag motion in the same direction. For successive applications of case 1, the circuit would close in six steps.

For example, it is probable that $(p^2/(R_{RR}^3 k_BT))\gg 1$. It is most probable that case 3 will occur repeatedly and that the polymer will have a conformation corresponding to a random walk in 3 dimensions. Thus, from random walk statistics, the expected radius of the volume occupied by the polymer after M links have formed is:

$$<r(M)>=[M\{R_{RR}^2 \sin^2(\pi/3)/3\}]^{1/2}$$

The smallest pore size might correspond to case 1 repeatedly occurring for 6 links. This would form a closed structure whose effective diameter is estimated as:

$$D=R_{RR}[1+2\sin(\pi/6)]=2R_{RR}$$

From the geometry of the hexagon that forms with repeated change in the link direction of $\pi/3$. The next larger pore size might correspond to the longest zig zag run of case 2, before case 1 occurs to cause a net change in direction. The probability that case 1 occurs instead of case 2 is:

$$\text{Prob}(1)/\text{Prob}(2)=\exp[-(p^2/(R_{RR}^3 k_BT))(2.75-0.5)].$$

And the probability that h links will occur without a net deflection is:

$$P(h \text{ straight (zig-zagging) links})=[\text{Prob}(2)]^h \text{Prob}(1).$$

The next larger pore size can be set equal to:

$$<h>=\int hdh\, P(h \text{ straight (zig-zagging) links})/\int dhP(h \text{ straight (zig-zagging) links})=\int hdh\, P(h \text{ straight (zig-zagging) links}).$$

Note that the scale length, that is, the size of the medium size pores—the mesopores—is temperature dependent, since the probabilities are temperature dependent. This is in contrast to the smallest scale length—the size of the smallest pores, the micropores—where the scale length is $2\times R_{RR}$.

With increasing formation temperature, the mesopore sizes increase and the micropore sizes are independent of temperature. The number of micropores and mesopores relative to the number of macropores increases as the formation temperature is raised. Since both micropore and mesopore sizes are related to the basic polymer link length, as well as the dipole interactions between adjacent links, the sizes can be changed by using other precursors than resorcinol and formaldehyde. The larger the starting molecules, the larger are the micro- and mesopores.

Deposition of Catalyst and Growth of Nanostructures

The ability to grow nanostructure 102 on the surface area provided by carbon aerogel 104 is accomplished by depositing a catalyst to create catalyst islands, affixed to carbon aerogel 104. The growth of nanostructures 102 is provided by controlling the formulation of the catalyst composition and by controlling the formation of the catalyst islands with regard to size and distribution.

In one embodiment, the process for depositing metal catalysts within the aerogel is to infuse the aerogel with metal salts in solution. As discussed above, aerogels are rich in carboxyl groups. Indeed, the resorcinol units with their carboxyl groups form permanent electric dipoles.

The desired metal catalysts bind strongly to the carboxyl sites on the aerogel, with the binding so strong that the rate of deposition can be increased by raising the solution temperature without fear of losing many of the bound metal ions to the solution. In one embodiment, the composition of the catalyst for the growth of the nanostructures, may include transition metals, such as Sc, Ti, V, Cr, Mn, Fe, Co, Ni, Cu, Zn and combinations thereof. In one embodiment, the catalyst may include a composition of about 70% iron and about 30% copper.

The composition of the metal mixture deposited on the aerogel may not be the same as that of the depositing solution, because it depends (exponentially) on the ionic binding energies. The dependence may be lessened as the temperature is raised; however, the strong binding energies tend to always create a strong difference.

The diameters of the nanostructures depend on the sizes of the catalyst islands deposited onto the substrate. The diameter of a nanostructure is essentially equal to the diameter of the catalyst island on which it grows. Thus, since the surface/volume ratio of a nanostructure is inversely proportional to its diameter, it is desirable to have small catalyst islands.

Deposition of Catalyst from Solution

In the embodiment described below, the deposition equations are presented for the catalyst from two competing metal ions in solution. Conservation equations give the kinetics of the deposition process. The steady-state solution to these equations gives the deposition isotherm that gives the concentration of the deposited catalyst ions in terms of their concentration in solution and the temperature at which the deposition takes place.

In this embodiment, the catalyst includes two competing ions in solution. The volume of solution V, can be calculated directly. The area of the aerogel surface A, can be set equal to the number of pores times the area per pore. Thus, for simplicity, considering only the macropores, then if each macropore has a typical dimension L and these macropores essentially fill the aerogel, then:

$$A = 4L^2 \times (V/L^3)$$

It is assumed that two of the surfaces of a typical aerogel pore are open, and a pore volume has been approximated as that of a cube. Other shape approximations can be made, but they do not change the results appreciably.

Note that the estimate in this embodiment does not include the micropore or mesopore areas, since the hydrated ions in solution may not migrate easily to these small pores. The surface area can be estimated by a standard nitrogen uptake procedure.

The area of a carboxyl site $A_{OH}$, can be estimated from the ionic radius of the carboxyl group as follows:

$$A_{OH} = \pi r_{OH}^2$$

where $r_{OH}$ is the length of the OH bond.

The volume of the aerogel $V_A$, can be determined by direct measurement. The total number of binding sites per unit area $N_T$ depends on the chemical makeup of the aerogel. The binding sites for the positively charged metal ions are the electronegative carboxyl sites in the aerogel building blocks. For example, in an RF aerogel, there are two carboxyl sites per benzene ring, whereas in a PF aerogel, there is one carboxyl site per benzene ring. Thus, taking a benzene ring to enclose an area of:

$$A_{benzene} = 6 \times [3.35 \times 3.35 \cos(\pi/6)] = 58.3 \text{ square Angstroms}$$

then approximately:

$$N_T = n/A_{benzene}$$

where n is the number of carboxyl sites per benzene ring. If n=2, then the surface density of carboxyl binding sites is:

$$N_T = 3.4 \times 10^{14} \text{ cm}^{-2}$$

It is assumed that at most only one ion can be attached to each carboxyl site. Thus, the surface number densities of ion species $N_1$, must be less than the surface density of carboxyl sites $N_T$. The volume number density of ions in solution $n_1$ can be measured directly.

Assuming thermal equilibrium, each kinetic degree of freedom for an ion in solution is excited to the extent of $k_B T/2$. Accordingly, $$M_i v_i^2 / 2 = (3/2) k_B T$$

where $M_i$ is the mass of an ion of species, and $v_i$ is its thermal velocity.

The equations indicate that there is a dependence of the surface concentrations of deposited catalyst on the temperature at which the process takes place. It should also be remembered that heat is released when a catalyst ion deposits on the substrate from solution, so that temperature control mechanisms should be employed for the process.

Binding energies of ions to substrate binding site $E_1$, are estimated from the ionic binding strengths between the relevant ion and the carboxyl group. The Boltzmann constant $k_B$, enters into the expressions because thermal equilibrium is assumed:

$$k_B = 1.38 \times 10^{-16} \text{ ergs/K}$$

Planck's constant h, enters into the expressions, since Eyring's absolute rate theory is used to estimate the rate at which bound ions release into the surrounding solution. Thus:

$$(dN_i/dt)_{release} = (k_B T/h) \exp(-E_i/k_B T)$$

Given these parameters, it is now straightforward to write conservation equations for the densities of ions ($N_1$, $N_2$), which describe the kinetics of the deposition process:

$$V dn_1/dt = -(n_1 v_1 A_{OH}/3)(N_T - N_1 - N_2) A + N_1 A (k_B T/h) \exp(-E_2/k_B T)$$

$$V dn_2/dt = -(n_2 v_2 A_{OH}/3)(N_T - N_1 - N_2) A + N_2 A (k_B T/h) \exp(-E_2 k_B T)$$

$$A dN_1/dt = -V dn_1/dt$$

$$A dN_2/dt = -V dn_2/dt$$

where the first terms on the right hand side of the first two equations each contain two factors. The first factor, $(n_i v_i A_{OH}/3)$, describes the flux of ionic species i impacting the surface area of a carboxyl site. The second factor, $(N_T - N_1 - N_2) A$, multiplies that factor by the total number of these carboxyl sites that are unoccupied. It is reduced from $N_T A$ by the number of sites occupied by the ions of both species that have already been deposited. Note: This may overestimate the amount of deposited material somewhat, compared to what the relative partition functions in solution and in the deposited state would give.

Steady State Solution: the Deposition Isotherm

The solution when all the time derivatives are equal to zero is of special interest, since this represents the equilibrium situation. When d/dt=0, in the above equations, they are rewritten as:

$$-(n_1 v_1 A_{OH}/3)(N_T - N_1 - N_2) A + N_1 A (k_B T/h) \exp(-E_1/k_B T) = 0$$

$$-(n_2 v_2 A_{OH}/3)(N_T - N_1 - N_2) A + N_2 A (k_B T/h) \exp(-E_2/k_B T) = 0$$

Solving these equations for the surface densities $N_1$ and $N_2$, yields:

$$N_1 = N_T/\Delta_1$$

$$N_2 = N_T/\Delta_2$$

where $$\Delta_1 = 1 + [3 k_B T/(h n_1 v_1 A_{OH})] \exp(-E_1/k_B T) + (n_2 v_2/n_1 v_1) \exp\{-(E_1 - E_2)/k_B T\}$$

$$\Delta_2 = 1 + [3k_B T/(hn_2 v_2 A_{OH})]\exp(-E_2/k_B T) + (n_1 v_1/n_2 v_2)\exp\{-(E_2-E_1)/k_B T\}$$

The ratio of the surface densities of the deposited ions in equilibrium is:

$$N_1/N_2 = \Delta_2/\Delta_1$$

which can be rewritten as:

$$N_1/N_2 = [1 + \{3k_B T/(hn_2 v_2 A_{OH})\}\exp(-E_2/k_B T) + (n_1 v_1/n_2 v_2)\exp\{-(E_2-E_1)/k_B T\} \times [1+[3k_B T/(hn_1 v_1 A_{OH})]\exp(-E_1/k_B T) + (n_2 v_2/n_1 v_1)\exp\{-(E_1-E_2)/k_B T\}]^{-1}$$

The steady-state solution to the deposition equations show that the deposited composition of the catalyst alloy is not the same as the composition in solution, and also show the sensitive dependence of the deposited composition on the temperature at which the deposition process is carried out.

An expression for the most likely distribution of island sizes can be obtained from statistical considerations, which indicates that the distribution favors small island sizes.

Distribution of Deposited Catalyst Island Sizes

The composition of the deposited catalyst can be different from the composition of the metal ions in solution, and in general, the composition of the deposited catalyst can be controlled to some degree by the temperature at which the deposition takes place.

To estimate the probability distribution of island sizes, the constrained maximum entropy approach of statistical physics is used.

Given that an island has n ions of ion species 1 and m ions of ion species 2. Then if $F(n,m)$=the number of islands with n ions of ion species 1 and m ions of ion species 2, the probability P of obtaining all different combinations of n and m in a collection of islands is:

$$P = \Pi[\{(n+m)F(n,m)\}!]^{-1}$$

where the product designated by $\Pi$ is over all possible combinations of n and m.

This expression is obtained by counting up all of the ways of obtaining different combinations of n and m in an island, and dividing by all of the equivalent distributions.

In the standard procedure of statistical physics, form the logarithm of the probability P and use Stirling's large argument approximation:

$$\ln(z!) => z \ln z \text{ when } z \gg 1$$

Then $$\ln P = \Sigma (n+m) F(n,m) \ln\{(n+m) F(n,m)\}$$

where the sum is over all possible values of n and m.

Maximum Probability

To determine the most likely distribution function $F(n,m)$, ln P is maximized subject to whatever constraints may exist.

The maximum of P occurs for $F(n,m)$ such that when there is a slight variation in $F(n,m)$, the corresponding variation in P will be zero:

$$\delta P/P = \delta[\ln P] = 0$$

However, the variation must take into account the constraints that exist on the system. Each constraint can be taken into account by adding the appropriate expression to the expression for ln P with a Lagrange multiplier that can be adjusted after the variation to assure that the constraint is satisfied.

Constraints and Lagrange Multipliers

The constraints that exist on the system are provided by the total number of deposited ions of each species:

$$N = \Sigma f(n,m) n$$

$$M = \Sigma f(n,m) m$$

where N and M are determined from the expressions for the surface densities of deposited catalyst ions, and where the summation is over all possible values of n and m.

Thus, two Lagrange multipliers $\alpha$ and $\beta$ are introduced as:

$$\delta P/P = \Sigma \delta F(n,m)[-(n+m)\ln\{(n+m)F(n,m) - (n+m)\} + \alpha n + \beta m]$$

Setting $\delta P/P = 0$ to find the $F(n,m)$ which gives a maximum probability distribution P:

$$F(n,m) = \{1/(n+m)\}\exp[-1 + (\alpha n + \beta m)/(n+m)]$$

with the additional constraint:

$$F(n,m) > 1$$

for all possible n and m, since the number of a given type island cannot be less than unity.

Determination of Lagrange Multipliers

With the simplifying assumption that for each island $$m = \xi n$$

where $$\xi = M/N$$

is the ratio of deposited catalytic ion species. The approximation shall be shown to be good to $O(M^{-1/2}, N^{-1/2})$.

Then $$F(n,m) = \{1/(n+m)\}\exp[-1 + (\alpha + \beta \xi)/(1+\xi)]$$

which can be expressed as:

$$F(n,m) = C/(n+m)$$

since the quantities in the exponent above are independent of n and m.

To determine the constant C, the constraining equation is applied:

$$\Sigma n F(n,m) = N$$

which may be expressed as:

$$\Sigma C n/(n+m) = EC/(1+\xi) = N$$

The summation here is from n=1 to $n_{max}$, where $n_{max}$ is chosen to satisfy the constraint $$F(n,m) > 1$$

which may be expressed as:

$$C/n_{max}(1+\xi) = 1$$

Combining the equations above:

$$n_{max}^2 => N$$

which may be expressed:

$$n_{max} = N^{1/2}$$

The maximum possible number of ions of one species in an island is equal to the square root of the total number of deposited ions of that species. For $n<n_{max}$, it can be shown that:

$$F(n, m=\xi n)=C/(n+m)=C/(n+\xi n)=n_{max}/n$$

The probability distribution of island sizes favors small islands, a very desirable situation for the growth of small nanostructures within the aerogel.

Catalyst Island Sizes within a Pore

Within a pore of linear dimension L, the area of the pore has been previously estimated to be approximately $4L^2$.

As a numerical example, suppose L=500 Angstroms, a typical value for an RF aerogel. Then the surface area of the pore is:

$$A_{macropore}=4\times2.5\times10^{-11}=10^{-10}\ cm^2$$

The surface density of carboxyl sites for an RF aerogel has been estimated to be $3.4\times10^{14}\ cm^2$. Thus, the total number of possible binding sites in a macropore can be estimated as:

N(total possible number of binding sites in a macropore)=34,000

The likelihood of finding an island containing n ions is inversely proportional to n, up to a maximum, $n_{max}$ that is equal to the square root of the total number of deposited ions in the region of interest. For example, the catalytic island size within a typical size macropore (500 Angstroms) as a function of the fraction of possible carboxyl sites occupied has been found to be:

| Fraction of possible sites occupied by deposition from solution | Maximum number of ions of one species in a pore island |
|---|---|
| 1/1000 | 6 |
| 1/100 | 18 |
| 1/10 | 58 |

In another example, the maximum likely diameter of a catalyst island within a macropore as a function of the fraction of possible carboxyl sites occupied has been found to be:

| Fraction of possible sites occupied by deposition from solution | Maximum likely diameter of a catalyst island within a pore in Angstroms |
|---|---|
| 1/1000 | 12 |
| 1/100 | 20 |
| 1/10 | 37 |

These exemplary island sizes are favorable for the growth of small diameter nano-fibers and nano-tubes with the large surface/mass ratios desired for hydrogen storage.

The allowable relative concentrations of metallic ions for the catalytic growth of carbon nanostructures can be determined with reference to a representative ionic solution of Fe, Cu, and Cl. The most likely distribution of ions in solution is obtained by statistical physics techniques subject to the appropriate constraints. The deposition isotherm derived above can be used to estimate the relative concentrations of metallic ions in solution required to obtain small catalyst islands.

Allowable ion mixtures in solution can be determined by applying a Maxwell-Boltzmann distribution to the possible ion forms, subject to the constraints provided by the initial concentrations of salts used. The electrons in the system can exchange places among the different ions, and the equilibrium distribution is that for which the electron distribution among ions gives the lowest energy for the system allowed by the temperature of the solution.

This statistical physics approach can be applied by estimating the energies of the electrons in different ion states, for example, by calculating the ionization energies of the ions in solution.

Solvation Energies

It is known that it is energetically more favorable for an ion to exist in a solution than for it to exist in a vacuum. An expression for the amount by which an ion's energy in solution is less than the ion's energy in vacuum has been determined to be:

$$E(q: solvation)=(q^2/2a)[(K-1)/K]$$

where a is the radius of the charge q. This is done by considering the solution to be a dielectric medium of relative dielectric constant K.

This can be shown by integrating the energy of the electric field over the volume outside the ion, first in a vacuum and then in the dielectric. Alternatively, it can be derived by assembling the charge q piece by piece, first in a vacuum and then in the dielectric.

For typical solvents of ionic salts, the dielectric constant can be rather large. Examples of interest for nanostructure/aerogel system 100 are water with a dielectric constant 80, Methanol with a dielectric constant of 34, and Ethanol with a dielectric constant of 26.

Since the dielectric constant is so large for these solvents, it is apparent that a charge would much rather exist in the solvent rather than in a vacuum, that is, the salvation energy is almost equal to its electrostatic self-energy.

Modification of Vacuum Ionization Energies

The composition of the metallic islands for the growth of carbon nanostructures can be one or a combination of many transition metals, such as Sc, Ti, V, Cr, Mn, Fe, Co, Ni, Cu, and Zn. In one embodiment, the composition of the metallic islands for the growth of carbon nanostructures is 70% iron and 30% copper. The iron and copper can exist in the following ionic states: $Fe^{++}$ [ferrous ion], $Fe^{+++}$ [ferric ion], $Cu^+$ [cuprous ion], and $Cu^{++}$ [cupric ion]. These states differ by the number of electrons present. For an ion to transition from one charge state to another, the electron must either receive or give up the associated ionization energy. The ionization energy for different ions in a vacuum can be found listed in the CRC Handbook. However, to obtain the ionization energy of an ion of charge q in solution, consider the following artificial sequence of events: Remove the ion of charge q from solution to vacuum. This requires expenditure of energy E(q: solvation). Remove an electron of charge magnitude e from the ion when it is in vacuum, changing its charge to q+e, where e is the charge on the electron. This requires expenditure of the ionization energy in vacuum $I(q \rightarrow q+e;\ vacuum)$. Move the ion of charge q+e back into solution. Thus releasing the solvation energy: E(q+e; solvation).

Since the initial and final states are the same as if the electron were simply removed from the ion while it remained in solution, this shows that the ionization energy in solution is:

$I(q\to q+e; \text{solution})=I(I(q\to q+e; \text{vacuum})+E(q: \text{solvation})-E(q+e; \text{solvation})$ which upon substitution yields the expression:

$I(q\to q+e; \text{solution})=I(I(q\to q+e; \text{vacuum})-(e/2a)[1-(1/K)](2q+e)$ When q>0: Ionization energy in solution<Ionization energy in vacuum. When q<0 Ionization energy in solution>Ionization energy in vacuum.

In solution, the ionization energy of a positive ion is decreased, whereas for a negative ion, it is increased.

Example: Solution of Fe, Cu, and Cl

In one example, a solution for which the anion that balances the charges on the Fe and Cu is provided by Cl. In solution, this exists as the ion $Cl^-$.

From the CRC Handbook, the following ionization energies in vacuum are known:

| | |
|---|---|
| $Fe \to Fe^+$ | 7.37 eV |
| $Fe^+ \to Fe^{++}$ | 16.18 |
| $Fe^{++} \to Fe^{+++}$ | 30.65 |
| $Fe^{+++} \to Fe^{++++}$ | 54.8 |
| $Cu \to Cu^+$ | 7.726 eV |
| $Cu^+ \to Cu^{++}$ | 20.29 |
| $Cu^{++} \to Cu^{+++}$ | 36.83 |
| $Cl^- \to Cl$ | 3.8 eV |
| $Cl \to Cl^+$ | 12.97 |

The following solvation energies are also known:

| | |
|---|---|
| $Cl^-$ | 2.8 eV |
| $Fe^{++}$ | 21.7 |
| $Cu^{++}$ | 23.3 |

Since the dielectric constants shown above for water, methanol and ethanol are so large, an approximation of the salvation energies can be made making it virtually the same in all three solvents. The error incurred by this approximation is only about 3%.

Solving $E(q: \text{solvation})=(q^2/2a)[(K-1)/K]$ provides an estimate of the solvation energies for other charge states, as follows:

| | |
|---|---|
| Fe | 0 eV |
| $Fe^+$ | 5.425 |
| $Fe^{++}$ | 21.7 |
| $Fe^{+++}$ | 48.8 |
| Cu | 0 eV |
| $Cu^+$ | 5.825 |
| $Cu^{++}$ | 23.3 |
| $Cl^-$ | 2.8 eV |
| Cl | 0 |

The ionization energies in solution are found to be:

| | |
|---|---|
| $Fe \to Fe^+$ | 1.95 eV |
| $Fe^+ \to Fe^{++}$ | −0.1 |
| $Fe^{++} \to Fe^{+++}$ | 3.55 |
| $Fe^{+++} \to Fe^{++++}$ | 16.8 |
| $Cu \to Cu^+$ | 1.90 eV |
| $Cu^+ \to Cu^{++}$ | 2.81 |
| $Cu^{++} \to Cu^{+++}$ | 7.70 |
| $Cl^- \to Cl$ | 6.6 eV |
| $Cl \to Cl^+$ | 10.2 |

Note that $Fe^+$ has a negative ionization energy, meaning it is unstable, which explains why $Fe^+$ does not exist in solution. Also the ionization energies of $Fe^{+++}$, $Cu^{++}$, and Cl are each very large, explaining why $Fe^{++++}$, $Cu^{+++}$, and $Cl^+$ are not found in solutions.

Statistical Distribution of Ions in Solution

Given that Fe, Cu, and Cl ions are mixed together in a solvent with a large dielectric constant, for example, water, methanol or ethanol, the collection of different possible ions in solution can be regarded as the various possible states for the valence electrons. Then, the distribution can be determined by a Maxwell-Boltzmann-type distribution of the electrons among the different energy levels E(i) associated with the different ionic states.

This distribution can be derived using the standard statistical physics approach of (1) enumerating the total number of ways of obtaining a given distribution, and (2) choosing the distribution that maximizes the total number of ways subject to the constraints imposed by boundary and initial conditions.

The total number W of possible arrangements is therefore:

$W=N(Fe)!N(Cu)!N(Cl)!/\Pi n(i)!$ where the $\Pi$ in the denominator denotes the product over all i.

Selecting n(i) to maximize W subject to constraints enumerated below and assuming that all the n(i) are large, Stirling's approximation is used to write:

$\ln W => N(Fe)\ln N(Fe)+N(Cu)\ln N(Cu)+N(Cl)\ln N(Cl)-\Sigma n(i)\ln n(i)$

The constraints to be imposed are:

$\Sigma i=1-4 n(i)=N(Fe)$ $\Sigma i=5-7 n(i)=N(Cu)$ $\Sigma i=8-9 n(i)=N(Cl)$ since it is known what the total number of each type of chemical is placed into solution.

In addition, to have charge neutrality:

$\Sigma z(i)n(i)=0$ where $z(i)e=q(i)$ and q(i) is the charge of the ion labeled by i. For example, z(3)=2 and z(8)=−1. The condition that the total energy of the system is known:

$\Sigma n(i)E(i)=E(\text{total})$

The most probable distribution n(i) is then determined by maximizing the ln W expression above subject to the four constraints. This can be done by introducing Lagrange multipliers C(Fe), C(Cu), C(Cl), C(q), and C(E), and maximizing $\ln W'=\ln W+C(Fe)[\Sigma i=1-4n(i)-N(Fe)]+C(Cu)[\Sigma i=5-7n(i)-N(Cu)]++C(Cl)[\Sigma i=8-9n(i)-N(Cl)]+C(q)[\Sigma z(i)n(i)]+C(E)\Sigma E(i)n(i)]$ By varying n(i) in W', the conditions for a maximum are found:

$$\ln(n(i)+1+C(Fe)+C(q)z(i)+C(E)E(i)=0 \quad i=1,2,3,4$$

$$\ln(n(i)+1+C(Cu)+C(q)z(i)+C(E)E(i)=0 \quad i=5-7$$

$$\ln(n(i)+1+C(Cl)+C(q)(z(i)+C(E)E(i)=0 \quad i=8,9$$

These can be solved for n(i):

$$n(i)=A(Fe)\exp[-C(E)E(i)]\exp[-C(q)z(i)] \quad i=1,2,3,4$$

$$n(i)=A(Cu)\exp[-C(E)E(i)]\exp[-C(q)z(i)] \quad i=5-7$$

$$n(i)=A(Cl)\exp[-C(E)E(i)]\exp[-C(q)z(i)] \quad i=8,9$$

where the A's and C's are constants that can be evaluated from the constraints, with $$C(E)=1/k_B T$$

Here, $k_B$ is Boltzmann's constant and T is the temperature. The distribution is of the Maxwell-Boltzmann form, but the constant multiplying $\exp[-E(i)/k_B T]$ depends on both the chemical family to which the state belongs, and on the charge of the corresponding ion.

For example, in a solution of Fe, Cu, and Cl the preferred ions are those with the lowest energy levels. However, the Lagrange multipliers indicate that only those ions can be present that are consistent with possible electron exchanges from the initial ion concentrations.

Figure 6:
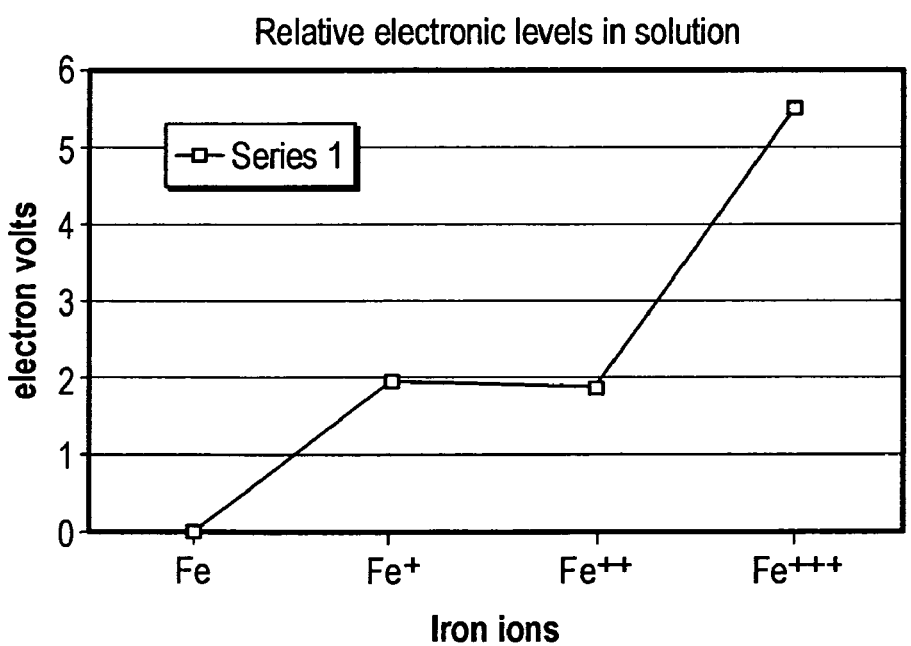
FIGS. 6-8 show relative electronic energy levels for Fe, Cu, and Cl, repsectively in a solvent with a large dielectric constant.
Figure 7:
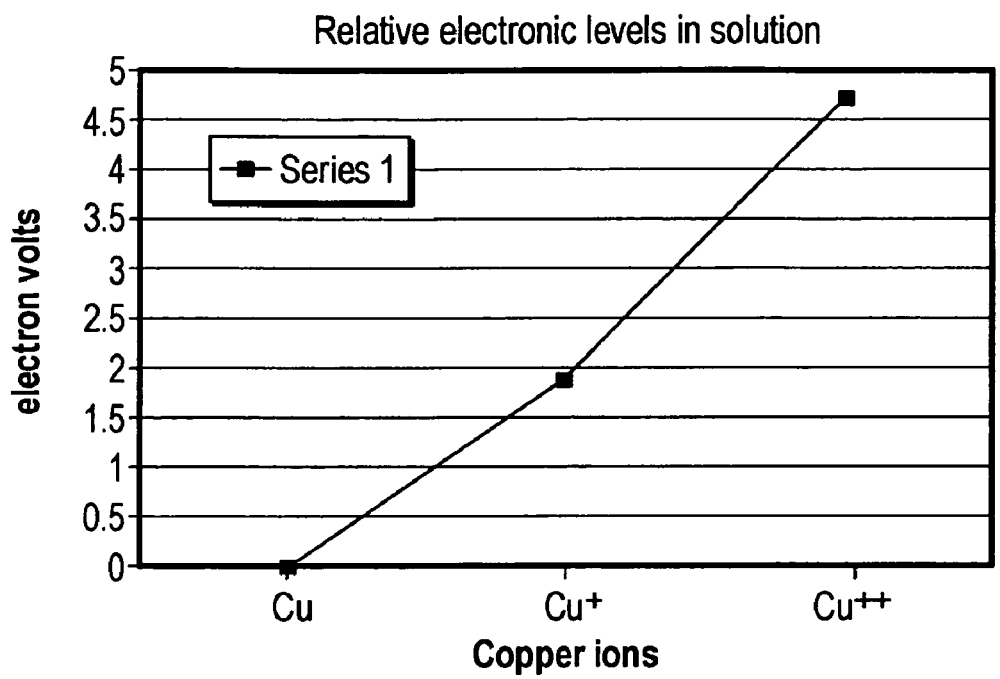
Figure 8:
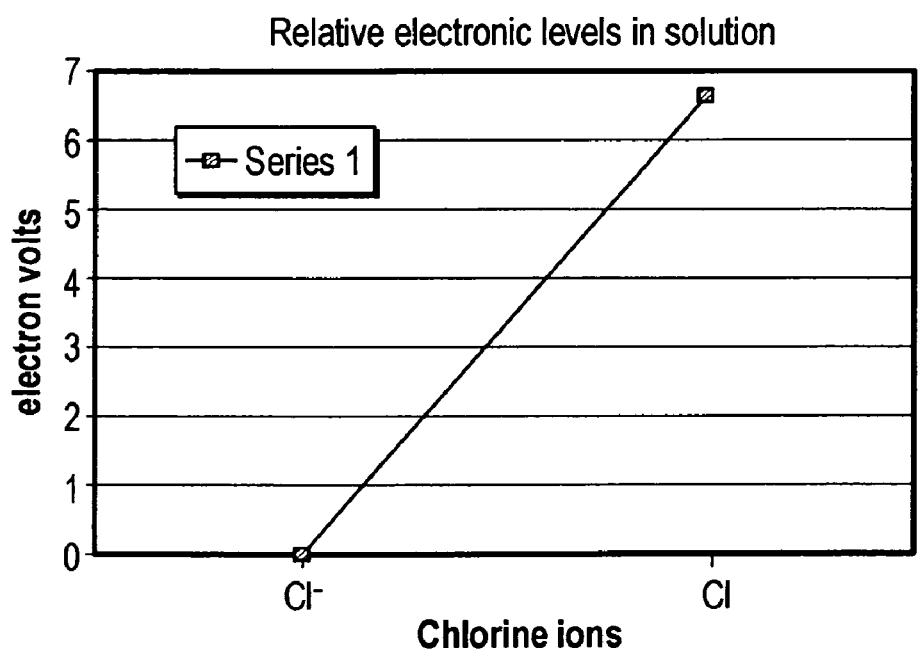
Figure 9:
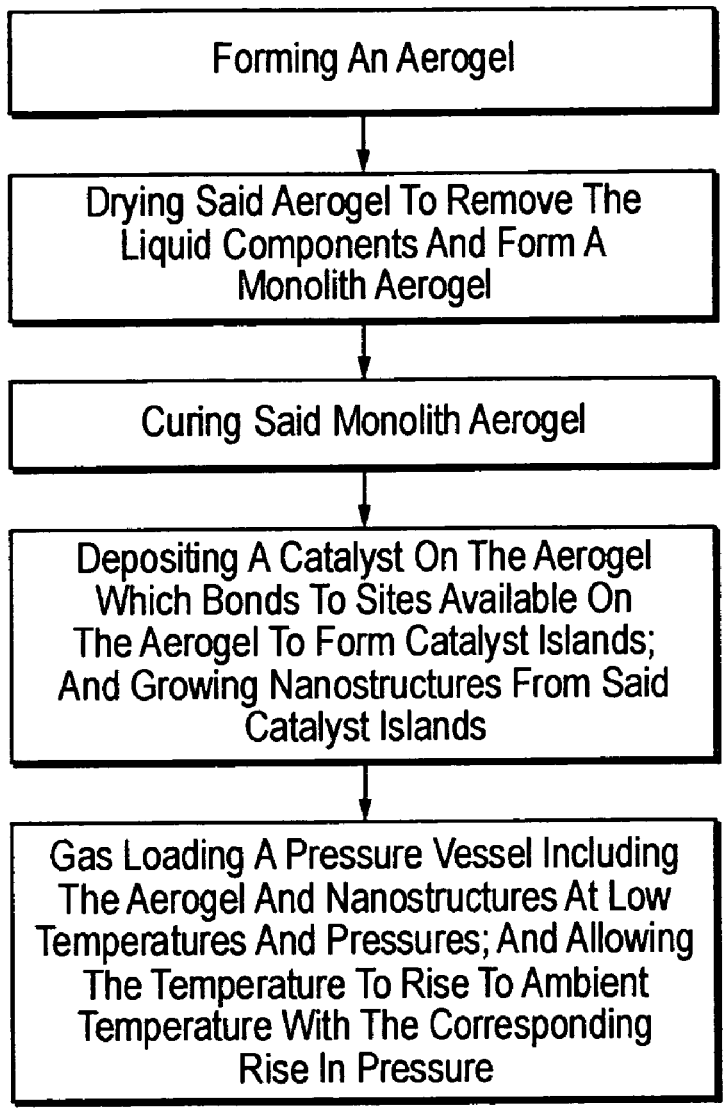
FIG. 9 is a flowchart of a mentioned of the present invention.

The significance of this for Fe, Cu, and Cl can be seen from a simple display of the ionization energy results. In FIGS. 6-8 the energy levels are shown for each of the chemical families (Fe, Cu, and Cl) vs the charge state.

As shown in FIGS. 6-8, the electrons can change states by leaving one ion and adding onto another ion, providing that the exchange of sites is energetically favorable and the exchange conserves charge. Thus, if an electron is removed from an ion, the position on a chart must move to the right. Conversely, if an electron is added to an ion, the position on the chart must move to the left. This leads to a graph conservation rule: If on 1 chart, a process occurs in which the position moves n steps to the right (n=1,2), then on another chart, a process must occur in which the position moves n steps to the left (n=1,2). The energy requirement (ignoring the small thermal energies compared to the ionization energies) leads to a graph conservation rule: If on 1 chart, a process occurs in which the position moves up, on another chart, a process must occur that moves down with a magnitude of change larger than on the chart in which the position moves up.

These rules are the simple graphical representation of the statistical physics equations above for the situation where the ionization energies are much larger than the thermal energy (which is only 0.025 eV at room temperature).

Applying these rules to FIGS. 6-8, several conclusions can be drawn about an ionic solution containing Fe, Cu, and Cl:

Observation 1. $Cl^-$ is a very stable ion in the presence of Fe and Cu. This is true since $Cl^-$ requires 6.6 eV to convert to Cl, and there is no process moving from right to left one position on either the Fe or Cu graphs that can provide this much energy.

Observation 2. Addition of $Fe^0$ to the solution will cause $Cu^0$ to precipitate out. This is true since the transition $Fe \rightarrow Fe^{++}$ releases more energy than is required for the transition $Cu^{++} \rightarrow Cu$. This is also consistent with the electrochemical series, in which any baser metal (i.e. a metal with a lower work function) will displace any nobler metal (i.e. a metal with a higher work function). Fe is baser than Cu.

Observation 3. $Fe^{++}$ is compatible with $Cu^+$ and $Cu^{++}$ in solution. This is so since 3.55 eV is required for $Fe^{++}$ to become $Fe^{+++}$ whereas when $Cu^{++}$ comes $Cu^+$, only 2.815 eV is released, and since the transition of $Cu^+$ to Cu only releases 1.901 eV.

Observation 4. $Fe^{+++}$ and $Cu^{++}$ are compatible in solution. When $Fe^{+++}$ converts to $Fe^{++}$, it releases 3.55 eV, but 7,705 eV is required to convert $Cu^{++}$ to $Cu^{+++}$. On the other hand, to raise $Fe^{+++}$ to $Fe^{++++}$, 16.8 eV is required, and the conversion of $Cu^{++}$ to Cu=only releases 2.815 eV.

Observation 5. Deposition of metallic alloy islands comprised of 70% iron and 30% Cu should be possible from an ionic solution of Fe, Cu, and Cl.

The Langmuir isotherm equation describing the deposition of catalytic alloy islands from solution can be applied to the specific case of Fe and Cu deposition. To arrive at small catalyst island sizes, it is reasonable to assume occupation of ½ of the available sites. Thus:

$$N_1/N_T=0.7\times(\tfrac{1}{2})=0.35$$

$$N_2/N_T=0.3\times(\tfrac{1}{2})=0.15$$

which yields:

$$n_1 v_1=0.7[3k_B T/(hA_{OH})]\exp[-E_1/k_B T]$$

$$n_2 v_2=0.3[3k_B T/(hA_{OH})]\exp[-E_2/k_B T]$$

The binding energies $E_1$ and $E_2$ can be estimated from the ionic radii and the radius of the charged carboxyl site, assuming a single layer of solvent molecules surrounding the charges. The thermal velocities are given by:

$$vi=[3k_B T/m_i]^{1/2}$$

Since Fe has an atomic weight of 55.85 and Cu has an atomic weight of 63.54, given a temperature of T=3500° K, it is found that:

$$v_{Fe}=0.394\times 10^5 \text{ cm/sec}$$

$$v_{Cu}=0.369\times 10^5 \text{ cm/sec}$$

Given that $A_{OH}=10^{-15}$ cm², then $N_T=3.4\times 10^{14}$ cm⁻². Thus, with $h=6.625\times 10^{-27}$ erg sec, then:

$$n_{Fe}(3+)=2.7\times 10^{21} \text{ cm}^{-3}$$

$$n_{Cu}(2+)=5.2\times 10^{21} \text{ cm}^{-3}.$$

Even though the desired ratio of bound ions is Fe:Cu=7/3=2.33, the ratio of ferric to cupric ions in solution is 0.52. This is because the binding energy of the ferric ion to the carboxyl ion is larger than that of the cupric ion to the carboxyl ion.

Figure 5B:
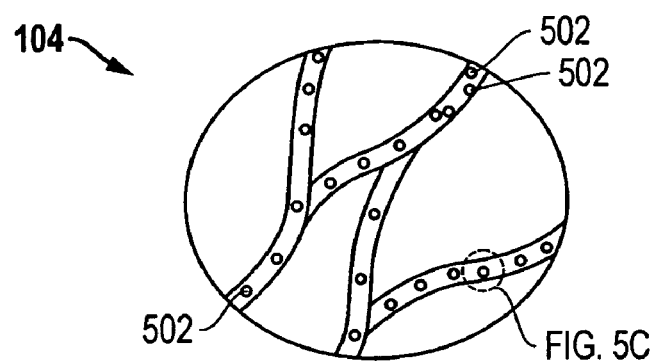
FIG. 5B is a simplified illustration showing a magnified partial view of FIG. 5A of an aerogel structure in accordance with an embodiment of the present invention.

FIG. 5B is a pictorial illustration showing a magnified partial view of FIG. 5A. On the surface of carbon aerogel 104 is deposited a multitude of islands of alloy metal 502. The nanostructures grow preferentially from these islands.

Figure 5C:
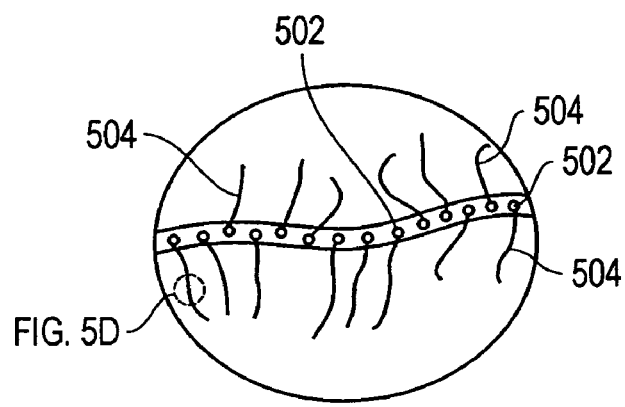
FIG. 5C is a simplified illustration showing a magnified partial view of FIG. 5B of an aerogel structure of randomly disposed inter-engaged nanostructures in accordance with an embodiment of the present invention.

FIG. 5C is a pictorial illustration showing a magnified partial view of FIG. 5B. As illustrated in the figure, nano-filaments 504 are shown having been grown on the islands of alloy metal 502. The result is a system of randomly disposed inter-engaged nano-filaments 504 disposed in a three-dimensional reticulate structure, supported by microporous carbon aerogel structure 104.

Figure 5D:
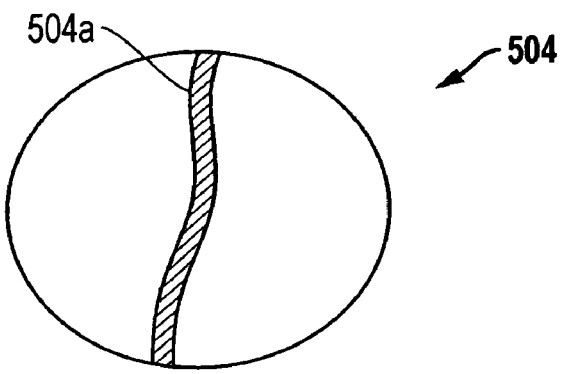
FIG. 5D is a simplified illustration showing a magnified partial view of FIG. 5C of a single nanostructure in accordance with the present invention.
Figure 5E:
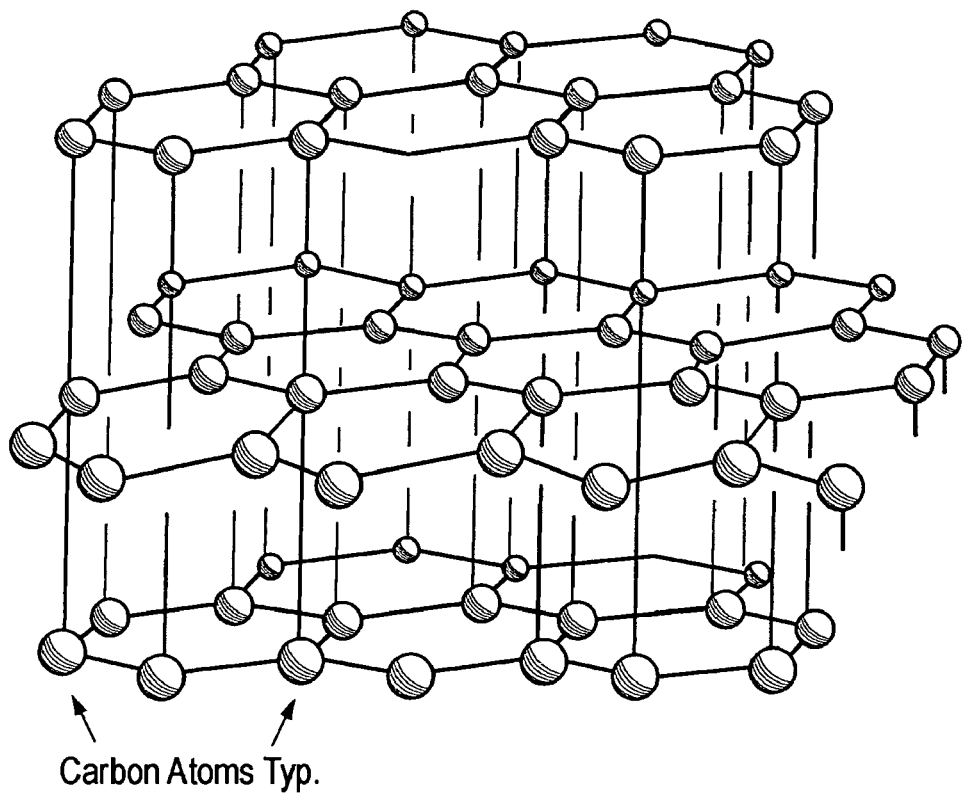
FIG. 5E is a simplified illustration showing a magnified partial view of FIG. 5D of a graphite model of carbon atoms bonded together in layers.

FIG. 5D is a pictorial illustration showing a magnified partial view of FIG. 5C of a single nano-filament 504, such as solid carbon fibers 504a, in accordance with the present invention. FIG. 5E is a pictorial illustration showing a magnified partial view of FIG. 5D of a graphite model of carbon atoms bonded together in layers.

Growing carbon fibers 504a on islands of alloy metal 502, as illustrated in FIGS. 5B-5D can be accomplished in many ways. As shown in FIG. 5E, in accordance with the present invention, carbon fibers 504a includes a stack 106 of graphite platelets 108 of molecular dimensions (FIG. 1A). Platelet stack 106 defines an outer cylindrical surface 110, which is capable of sorbing molecular in accordance with the principles of the present invention. Each carbon fiber 504a is a storage site structure that is capable of absorbing and desorbing molecules of, for example, hydrogen.

It is thought that that the platelets that form the carbon fiber "grow" or form the stacked structure of the carbon fiber due to the van der Waals forces which exist between the platelets. The platelet senses an image of its pi electrons and fluctuating dipoles in the metal catalyst, and binds to the catalyst because of the interaction of the pi electrons and the fluctuating dipoles.

In one embodiment, a solid carbon fibers 504a include a carbonaceous material, which has a region of amorphous carbon structure and a region of graphite structure. The carbonaceous material has a true density of 1.8 g/cm$^3$ or more and a peak in powder X-ray diffraction which corresponds to not more than 0.340 nm in an interplanar spacing. This space is occupied by the pi electrons in the adjacent stacked platelets that comprise the fiber. In this embodiment, the specific surface area as measured by means of an $N_2$ gas adsorption BET method was 1.2 m$^2$/g. The true density of carbon fibers was 2.0 g/cm$^3$. The co-existence of graphite structure region and amorphous carbon structure region in the fine texture of the carbon fibers was confirmed from the lattice image of an x-ray diffraction. When the diameter of fine pores existing in large number in the amorphous carbon region was measured by means of the small angle x-ray scattering method, the diameter of the pores was found to be 0.5 to 20 nm.

FIG. 3 is a simplified illustration showing an additional magnified partial view of FIG. 5D. In this embodiment, nano-filament 504 represents a carbon nano-tube 504b. Nano-tube 504b includes one or more sheets wrapped in a cylinder. If the ends are uncapped, then the hydrogen can adsorb to the outer and inner cylindrical surfaces of nano-tube 504b. It is understood that the graphite sheets which form the nano-tubes find it energetically favorable to form closed cylindrical surfaces. Multiple cylindrical sheets form from the energetically favorable van der Waals forces acting between adjacent sheets. The formation conditions, such as reactant concentrations, temperature, and the like, determine whether a nano-tube or a nano-fiber forms. These conditions are well known to those of ordinary skill in the art.

In one embodiment, a method for growing gas absorbing carbon fibers 504 includes passing an effective amount of a carbon-containing gas mixture of, for example, carbon monoxide, ethylene, and hydrogen in accordance with the following equations $3C_2H_4+7CO+H_2 \rightarrow 13C+7H_2O$; $C_2H_4+CO_2 \rightarrow 3C+2H_2O$; and $H_2+CO \rightarrow C+H_2O$ at a temperature between about 900° F. and about 1500° F.

Gas Adsorption Energy: Derivation of Langmuir Form and Coefficients

For a solid surface area exposed to a molecular gas (FIG. 1B), such as hydrogen gas, the hydrogen gas can have a number density (n) and a thermal speed (v), such that the number flux incident per unit area of the surface, $F_{incident}$, can be expressed as:

$$F_{incident}=nv/3 \quad [1]$$

Next, consider a gas molecule that is adsorbed to cylindrical surface 110. Under the conditions of interest, a monolayer can form on cylindrical surface 110. In some embodiments, five different types of adsorption isotherms have been observed, some of which correspond to the formation of multilayers on cylindrical surface 110. In the present embodiment, for ease of discussion and with no intent to limit the invention thereby, the discussion is of Type I isotherms, in which only a monolayer forms.

The adsorbed molecule is bound to cylindrical surface 110 by a potential well formed by the van der Waals interaction between the molecule and cylindrical surface 110. In this embodiment, the depth of the well is the van der Waals interaction energy V. The adsorbed molecule is thermally agitated, and undergoes oscillations in its potential well. Occasionally, the molecule has enough energy to escape from the well back into the vapor.

Using absolute rate theory (H. Eyring, J. Walter, G. F. Kimball, *Quantum Chemistry*. New York: Wiley and Sons, Inc. (1944)), the flux of adsorbed molecules per unit area leaving the surface can be expressed as:

$$F_{out}=N(k_BT/h)\exp(-V/k_BT). \quad [2]$$

In this equation, N denotes the number of adsorbed molecules per unit area, $k_B$ is Bolztmann's constant, T is temperature, and h is Planck's constant.

Not all of the flux incident on cylindrical surface 110 can adhere to cylindrical surface 110, since a hydrogen molecule must be incident on cylindrical surface 110 at a spot that is not already occupied by another adsorbed hydrogen molecule. For example, at a given saturation surface density, $N_S$, and a sticking coefficient of unity, when the surface is unoccupied, the fraction, f, of the incident flux, $F_{incident}$, that results in adsorption can be expressed as:

$$f=1-N/N_S. \quad [3]$$

Accordingly, with the foregoing given parameters, the time rate of change of N can be expressed as:

$$dN/dt=F_{incident}f-F_{out} \quad [4]$$

which can be further expressed as:

$$dN/dt=(1-N/N_S)nv/3-N(k_BT/h)\exp(-V/k_BT). \quad [5]$$

Thus, resulting in a desired adsorption equation under the parameters enumerated above for this embodiment. In equilibrium, $dN/dt=0$, and thus eq. [5] gives:

$$(1-N/N_S)nv/3-N(k_BT/h)\exp(-V/k_BT)=0 \quad [6]$$

This equation can be solved for the surface number density of adsorbed particles:

$$N=N_S(nv/3)[(nv/3)+N_S(k_BT/h)\exp(-V/k_BT)]^{-1} \quad [7]$$

For a thermally distributed ideal gas:

$$v=(3k_BT/m)^{1/2} \quad [8]$$

and $$P=nk_BT \quad [9]$$

where P is the gas pressure and m is the mass of the gas particle.

Thus:

$$nv/3 = P/(3mk_BT)^{1/2} \quad [10]$$

and eq. [7] becomes:

$$N = N_S(P/(3mk_BT)^{1/2})[(P/(3mk_BT)^{1/2}) + N_S(k_BT/h)\exp(-V/k_BT)]^{-1} \quad [11]$$

This equation has the form of the familiar Langmuir adsorption isotherm:

$$N/N_S = a_{Langmuir}P[1 + b_{Langmuir}P]^{-1} \quad [12]$$

In this embodiment, the constants are expressed in terms of the temperature T and the van der Waals adsorption energy V. Specifically:

$$a_{Langmuir} = b_{Langmuir} = h \exp(V/k_BT)[N_S(3m)^{1/2}(k_BT)^{3/2}]_{-1} \quad [13]$$

Equation [11], the isotherm equation, shows the saturation of adsorbed molecules since as P increases, the equation shows that N approaches $N_S$ asymptotically and eq. [13] shows a strong exponential dependence of the adsorption density on the temperature T and van der Waal's adsorption energy V.

The Langmuir isotherm equation is used to plot the pressure, temperature, and adsorption energy dependence of the occupancy of adsorption sites.

In one embodiment, the given parameters to be used in equations [12] and [13] are:

| | |
|---|---|
| Hydrogen adsorption energy (V): | 0.07 eV |
| Planck's constant (h) | $6.625 \times 10^{-27}$ erg sec |
| Boltzmann constant ($k_B$) | $1.38 \times 10^{-16}$ erg/degree Kelvin |
| Mass of hydrogen molecule (m) | $3.34 \times 10^{-24}$ gm |
| Temperature (T) | 300° K [room temperature] |
| | 77° K [liquid nitrogen temperature] |

FIG. 2A illustrates the fractional occupancy $f_H$ of the surface storage sites by molecular hydrogen as a function of pressure, at room temperature (300K). The pressure varies from 1 atmosphere to 200 atmospheres. The top curve represents a hydrogen adsorption energy of 0.07 eV, and the lower curve represents a hydrogen adsorption energy of 0.04 eV, where:

$$f_H = N/N_S \quad [14]$$

The curves in FIG. 2A show that a respectable fraction of the available sites is occupied by molecular hydrogen at pressures of O(100 atmospheres). The importance of the adsorption energy is evident in this plot. An increase in the adsorption energy from 0.04 eV to 0.07 eV more than doubles the fractional occupancy.

The impressive effect of temperature is evident in FIG. 2B, where the plot is repeated for liquid nitrogen temperature (77 K) rather than room temperature.

FIG. 2B illustrates the fractional occupancy $f_H$ of the surface storage sites by molecular hydrogen as a function of pressure at room temperature. The pressure varies from 1 atmosphere to 10 atmospheres. The top curve represents hydrogen adsorption energy of 0.07 eV, and the lower curve represents hydrogen adsorption energy of 0.04 eV. The curves show that at liquid Nitrogen temperatures, the hydrogen molecules occupy a considerable fraction of the surface sites even at atmospheric pressure. This arises from the strong exponential dependence of the Langmuir isotherm [eqs. (12) and (13)]. FIG. 2B also shows that near atmospheric pressure, the difference between an adsorption energy of 0.04 eV and 0.07 eV has a large effect on the fractional occupancy.

It should be noted that the results shown are exponentially dependent on the adsorption energy of hydrogen to the graphite surfaces of the system. If the theoretical estimate of this energy and the experimental results are found to be too small, then increased storage is achievable even at room temperature and atmospheric pressure.

Adsorption Area

Polymeric gel/nanostructure system 100 provides area on which the gas molecules can adhere: the walls of a macropore, which are not occupied by nanostructures; the walls of the mesopores; and the walls of nanostructures.

In one embodiment, the overall area upon which gas molecules can adhere can be estimated without including the area contribution of the micropores, which provides for the possibility that access to the micropores may at least be partially blocked by gas molecules adhering to the walls of the mesopores. Although this embodiment provides a conservative estimate of the overall adhesion area, it is not intended to limit the present invention in any way.

In the present embodiment, carbon aerogel 104 is an open structure, in the sense that the pores are interconnected. In one embodiment, each macrocell has a cubic geometry. Since there is interconnection between the different cells, approximately 2 out of the 6 walls of the cell are open. Thus, given that a side of the cubic cell has a length a, then the area of the macrocell that is not open is $4a^2$.

Not all of this area is available for hydrogen adsorption, however, as some of the area is occupied with nanostructures growing perpendicular to the walls as described in more detail below. In one exemplary embodiment, 1 of the 4 walls is to be considered occupied by nanostructures growing perpendicular to the walls. Thus, the available area for gas adsorption becomes:

$$A_{macropore} = 3a^2 \quad [15]$$

In one embodiment, the nanostructures are either nano-fibers or nano-tubes of radius r, each of which grows out from a wall until it encounters the opposite wall. In this embodiment, the area of the outer surface of the cylindrical nano-fibers is $2\pi ra$. For the nano-tubes, an inner surface area is also available, which effectively doubles the total surface area available, since both the outer surface area and the inner surface area of the tube may be available for adsorption of gas molecules. The following equation development is intended to account for both possibilities, thus, for the area of a cylindrical nanostructure:

$$A_1 = 2\pi ra\epsilon \quad [16]$$

where $\epsilon = 1$ for a nano-fiber $\epsilon = 2$ for a nano-tube  [17]

The area of all the cylindrical nanostructures (hereinafter also referred to as "nano-cylinder") in a macrocell is obtained by summing eq. [16] over all of the different radii nanostructures in the macrocell.

The radius of a cylindrical nanostructure is determined by the number of metal catalyst atoms deposited on the island from which the cylindrical nanostructure grows. The number N of metal atoms in an island is given by the distribution function:

$$F(N) = A'/N \text{ for } N < N(\max) \quad [18]$$

where A' is a constant determined from the total number $N_o$ of metal ions deposited in this case, on the walls of the mesocell.

It can be shown that:

$$N(\max)=N_o^{1/2}. \quad [19]$$

Thus:

$$\int F(N)NdN=N_o \quad [20]$$

so that $$A'[N(\max)-N(\min)]=N_o \quad [21]$$

Given that $N(\min)<<N(\max)$, and using eq. [19]:

$$A'=N_o^{1/2} \quad [22]$$

The distribution function g(r) for radii can be obtained from that for N from the equation:

$$g(r)=F(N)dN/dr. \quad [23]$$

Now, $$N=(r/q)^2 \quad [24]$$

where q is the radius of a site occupied by a single metal atom. Accordingly, $$g(r)=2A/r=2N_o^{1/2}/r \quad [25]$$

The quantity $N_o$ can be expressed in terms of the fractional occupancy $f_M$ which is the total number of available carboxyl binding sites in the macrocell for catalyst ions to reside. Since the total number of available sites in the macrocell is:

$$N_o(\max)=4A^2/\pi q^2 \quad [26]$$

The $\pi q^2$ term assumed for the binding area can be replaced by $4q^2$ if packing on a square grid is assumed, or by $3 \times 3^{1/2}$ if hexagonal close packing is assumed.

Thus:

$$N_o=f_M N_o(\max)=f_M(5A^2/\pi q^2) \quad [27]$$

The maximum radius $r_{max}$ is given by $$N(\max)=(r_{max}/q)^2=N_o^{1/2} \quad [28a]$$

which can be expressed as:

$$r_{max}=2^{1/2}q^{1/2}f_M^{1/4}5A^{1/2}/\pi^{1/4} \quad [28b]$$

Thus, the maximum nano-cylinder radius is proportional to the geometric mean of the radius of the metal atom site q and the size of the macrocell a.

Finally, the area of the nanostructures in the macrocell is given by:

$$A_{nanocylinders}=\tfrac{1}{4}\int drg(r)2\pi ra\epsilon \quad [29]$$

Combining eqs. [22]-[29] yields:

$$A_{nanocylinders}=2^{3/2}\pi^{1/5}A^{5/2}f_M^{3/4}\epsilon/q^{1/2} \quad [30]$$

when it is assumed that $r_{min}<<r_{max}$.

The thickness of a macrocell wall can be denoted by w. Experimental data indicates that w is on the order of 100 Angstroms, since the macrocell walls are made of porous carbon spheres with diameters on the order of 100 Angstroms. Then, for the four closed walls of the macrocell, the total volume of the walls is:

$$V_{wall}=5A^2w/2 \quad [31]$$

where the factor of ½ is inserted, since each wall is shared with an adjoining macrocell.

Given the linear dimension of a mesocell within the wall is c. Then the total number of mesocells associated with a macrocell is:

$$n(\text{mesocells})=5A^2w/2c^3 \quad [32]$$

Since the available area of a mesocell is:

$$A_{mesocell}=4c^2 \quad [33]$$

the total area provided by the mesocells associated with a single macrocell is:

$$A_{mesopores}=8a^2w/c. \quad [34]$$

The total available area within a macrocell for hydrogen adsorption is thus:

$$A=A_{macropore}+A_{nanocylinders}+A_{mesopores} \quad [35]$$

which is:

$$A=3a^2+2^{3/2}\pi^{1/5}A^{5/2}f_M^{3/4}\epsilon/q^{1/2}+8a2w/c \quad [36]$$

The expression displays the importance of being able to control the length of a side of the cubic cell, a, the linear dimension of a mesocell, c, within the wall and the fractional occupancy $f_M$ in order to achieve a large area for hydrogen adsorption.

The nanostructures and the mesocells associated with a macrocell can contribute much more area to the macrocell than that provided by the walls of the macrocell themselves.

Figure 2C:
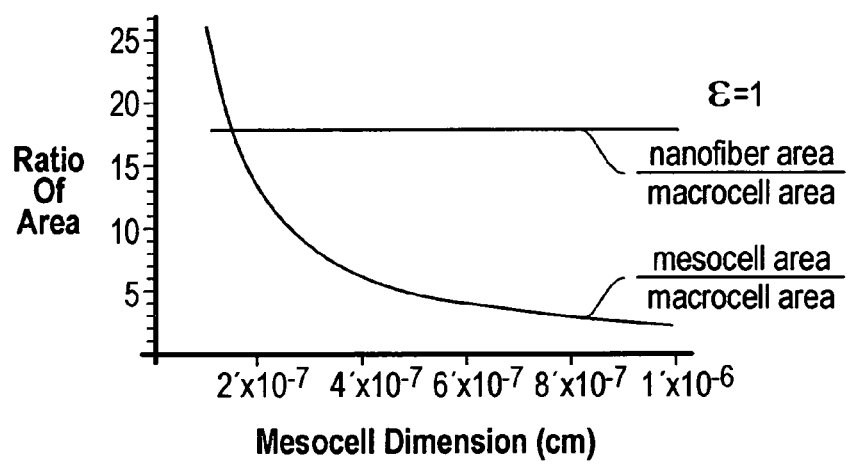
FIG. 2C is a graphical representation of the ratio of nano-fiber wall area to macrocell wall area (top curve) and the ratio of mesocell wall area to macrocell wall area (bottom curve) in accordance with an embodiment of the present invention.
Figure 2D:
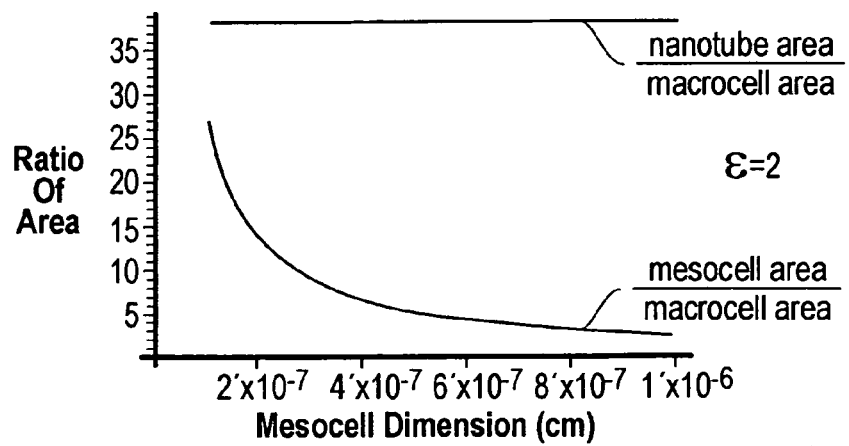
FIG. 2D is a graphical representation of the ratio of nano-tube wall area to macrocell wall area (top curve) and the ratio of mesocell wall area to macrocell wall area (bottom curve) in accordance with an embodiment of the present invention.

FIGS. 2C and 2D each display the ratios of the nanostructure area and the mesopore area to the macrocell wall area. FIG. 2C applies when the nanostructures are nanofibers ($\epsilon=1$) and FIG. 2D applies when the nanostructures are nano-tubes ($\epsilon=2$). The variable on the abscissa is the dimension of the mesocell, which varies from 10 Angstroms to 100 Angstroms. These graphs are prepared given that the metal catalyst was deposited as a monolayer on ½ of the available area, but that due to its thinness, it has no effect on the binding energy to the underlying graphite.

The graphs show that when the mesopore dimension is on the order of 10 Angstroms, the mesopores can contribute as much area as the nano-fibers, and almost as much area as the nano-tubes. The graphs also show that the effective area of the macrocell can be increased by a factor on the order of about 60 to 70 times over that of the macrocell walls themselves for attainable pore dimensions.

It is interesting to use the foregoing information to compare the effective storage capacity of polymeric gel/nanostructure system 100 with that of a pressurized container without carbon aerogel and nanostructures on which gas molecules, for example, hydrogen gas molecules, can be adsorb.

In one embodiment, the total number of hydrogen particles stored in a macrocell is:

$$\text{Number of hydrogen particles stored in a macrocell}=NA \quad [37]$$

where N is the surface density of hydrogen molecules given by the Langmuir isotherm, and A is the total available area given by Eq. [36]. Thus, the effective density of storage is:

$$n_{effective}=NA/a^3 \quad [38]$$

Equations [12] and [13] give:

$$N=N_S a_{Langmuir}P[1+b_{Langmuir}P]^{-1} \quad [[12]]$$

where $$a_{Langmuir} = b_{Langmuir} = h \exp(V/k_B T)[N_S(3m)^{1/2}(k_B T)^{3/2}]^{-1} \quad [13]$$

and eq. [36] gives:

$$A = 3a^2 + 2^{3/2}\pi^{1/5} A^{5/2} f_M^{3/4} \epsilon/q^{1/2} + 8a2w/c \quad [36]$$

Figure 2E:
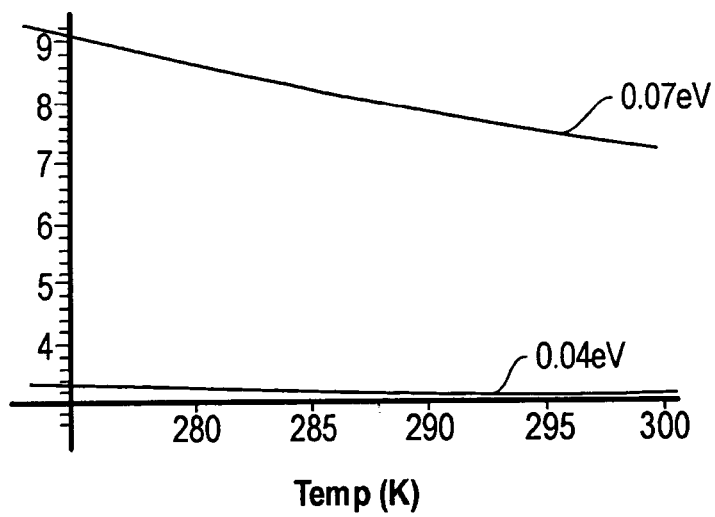
FIG. 2E is a graphical representation of the ratio of effective storage density in the polymeric gel/nanostructure system of the present invention to storage density in a straightforward pressurized container without carbon adsorption surfaces in accordance with an embodiment of the present invention.

FIG. 2E shows the ratio $n_{effective}/n$ where n is the actual density that exists at a given temperature and pressure in the absence of any carbon adsorption. The three curves are for the three adsorption energies used above: 0.038 eV, 0.055 eV, and 0.07 eV. The plots are for temperatures ranging from 0° C. to room temperature, 27° C. The top curve is for an adsorption energy of 0.07 eV; the middle curve is for an adsorption energy of 0.055 eV, and 0.038 eV. The macrocell dimension has been taken as 500 Angstroms, a macrocell wall thickness of 100 Angstroms has been assumed, and the mesocell dimension has been set equal to 10 Angstroms.

The curves show that the polymeric gel/nanostructure system 100 is several 10's of thousands times more effective in storing hydrogen than a simple pressurized storage container. The importance of a strong adsorption binding is evident, as in this temperature range (from freezing to room temperature), the 0.07 eV curve can be three times the effective density as the 0.038 eV curve.

Figure 2F:
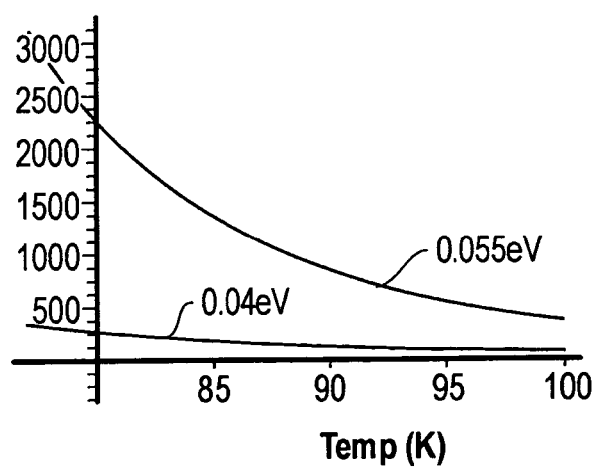
FIG. 2F is a graphical representation of the ratio of effective storage density in the polymeric gel/nanostructure system of the present invention to storage density in a straightforward pressurized container without carbon adsorption surfaces at temperatures ranging from −73° C. to room temperature, 27° C. in accordance with an embodiment of the present invention.

As shown in FIG. 2F, when the temperature is lowered further, for example, to −73° C., the effective density increases even more dramatically. In FIG. 2F, the plot is for an adsorption energy of 0.07 eV. The macrocell dimension has been taken as 500 Angstroms, a macrocell wall thickness of 100 Angstroms has been assumed, and the mesocell dimension has been set equal to 10 Angstroms.

At the lower temperature, the effective storage density can be more than 100,000 times that of a pressurized container without carbon adsorption, for the same temperature and pressure.

Department of Energy Goals

The U.S. Department of Energy has set as a target goal for a hydrogen storage system:

$$DOE \text{ target storage density for hydrogen} = 62 \text{ kg/m}^3 \quad . [39]$$

The DOE goal is considered to be a benchmark for comparison as to the effectiveness of the present invention and is in no way intended to limit the invention. In one embodiment of polymeric gel/nanostructure storage system 100 of the present invention, the mass density can be provided as:

$$\rho = (m f_H A/\pi q^2)(a+w)^3 \quad [40]$$

where:

$$f_H = a_{Langmuir} P [1 + b_{Langmuir} P]^{-1} \quad [12]$$

$$a_{Langmuir} = b_{Langmuir} = h \exp(V/k_B T)[N_S(3m)^{1/2}(k_B T)^{3/2}]^{-1} \quad [13]$$

$$A = 3a^2 + 2^{3/2}\pi^{1/5} A^{5/2} f_M^{3/4} \epsilon/q^{1/2} + 8a2w/c. \quad [36]$$

Note: to convert to cgs units, giving ρ in gm/cc, eq. [40] is multiplied by 1000 to yield:

$$\rho[\text{kg/m}^3] = 10^3 (m f_H A/\pi q^2)(a+w)^3 \quad [41]$$

where the quantities on the right hand side are expressed in terms of gm and cm.

Figure 2G:
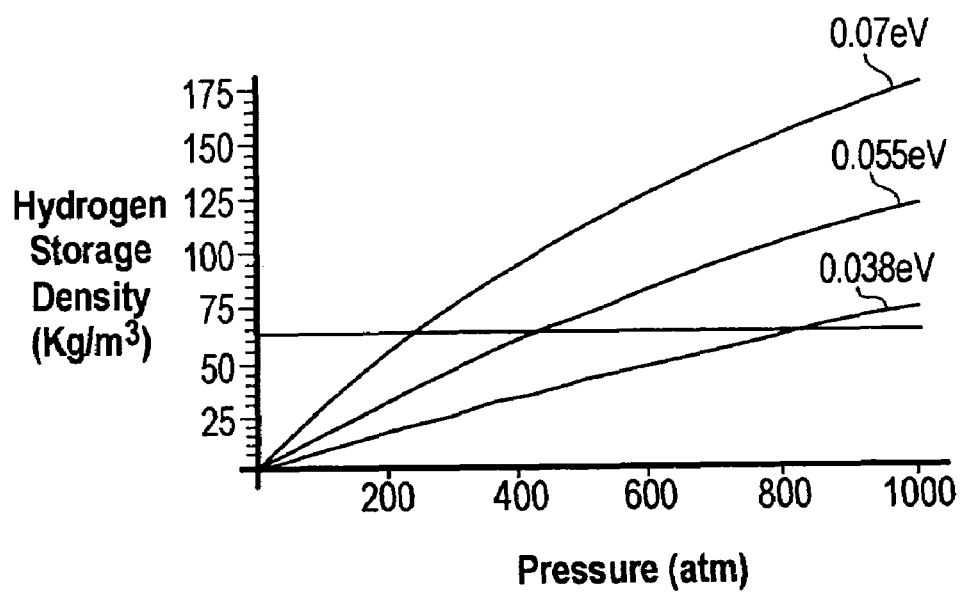
FIG. 2G shows the capacity of the polymeric gel/nanostructure system of the present invention expressed in kg/m$^3$ at room temperature for pressures between 1 atmosphere and 200 atmospheres in accordance with an embodiment of the present invention.
Figure 2H:
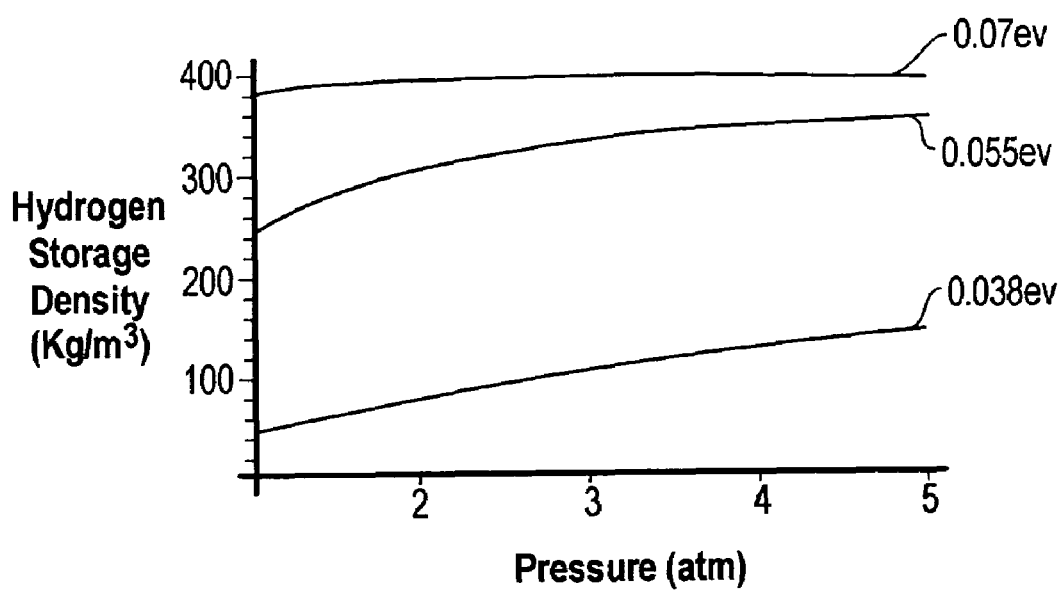
FIG. 2H shows the capacity of the polymeric gel/nanostructure system of the present invention expressed in kg/m$^3$ at 77 K for pressures between 1 atmosphere and 5 atmospheres in accordance with an embodiment of the present invention.

FIGS. 2G and 2H illustrate the capacity as a function of pressure for three adsorption energies: 0.038 eV, 0.055 eV, and 0.07 eV. FIG. 2G applies at room temperature, T=300° K, and FIG. 2H applies at the liquid nitrogen temperature of 77° K.

FIG. 2G shows the capacity of polymeric gel/nanostructure system 100 expressed in kg/m³ at room temperature for pressures between 1 atmosphere and 200 atmospheres. The top curve is for an adsorption energy of 0.07 eV, the middle curve is for 0.055 eV and the bottom curve is for 0.038 eV. The metal catalyst fractional deposition was assumed to be ½, and the dimensions assumed were: 500 Angstrom macrocell, 100 Angstrom macrocell wall thickness, and 10 Angstrom mesocell.

FIG. 2H shows the capacity of polymeric gel/nanostructure system 100 expressed in kg/m³ at 77° K for pressures between 1 atmosphere and 5 atmospheres. The top curve is for an adsorption energy of 0.07 eV, the middle curve is for 0.055 eV and the bottom curve is for 0.038 eV. The metal catalyst fractional deposition was assumed to be ½, and the dimensions assumed were: 500 Angstrom macrocell, 100 Angstrom macrocell wall thickness, and 10 Angstrom mesocell.

The plots show that the Department of Energy goal of 62 kg/m³ is met or even exceeded, for example at 77° K, even at or close to atmospheric pressures. The plots also show that at room temperature, the Department of Energy goal can be approached if the pressure is increased to the order of 200 atmospheres (2,940 psi).

Storage Vessel

FIG. 4A is a simplified cross-sectional view of vessel 300 in accordance with an embodiment of the present invention. FIG. 4B is a sectional view taken substantially as indicated by line 4B-4B on FIG. 4A. Vessel 300 can include a top closure 301a, a bottom closure 301b and a cylindrical sleeve 302 (also referred to as the "vessel components"), which together define an internal chamber. Top closure 301a, bottom closure 301b and cylindrical sleeve 302 can be made from any suitable high-pressure storage vessel materials depending on the temperatures and pressures of interest, such as chromium-molybdenum and type 316 stainless steel. The wall thickness of the vessel components may vary depending on the size of vessel 300, the materials used, and the operating temperatures and pressures. Two gaskets 303 can be inserted at the interface between top closure 301a and bottom closure 301b and cylindrical sleeve 302. Top closure 301a, bottom closure 301b and cylindrical sleeve 302 can all be coupled together using split rings 304, pipe clamps 306 between and bolts 308, which are drawn into sealing engagement to seal pressure vessel 300. The maximum pressure that can be contained in such a vessel varies inversely with the square of the radius. The internal chamber of vessel 300 can be used as a high-pressure supercritical drying chamber and as a storage vessel for molecular gas.

In one embodiment, sealing material 309 can be employed for treating vessel 300 against embrittlement, for example, embrittlement due to exposure to hydrogen. In this embodiment, top closure 301a, bottom closure 301b, and cylindrical sleeve 302 incorporate sealing material 309, which forms a seal resistant to hydrogen gas permeation at the operating temperatures and pressures of the present invention. Sealing material 309 can include, for example, sodium silicate, potassium silicate and lithium silicate, and combinations thereof. An expanding cement or non-shrinking cement can be used to couple together top closure 301a, bottom closure 301b and cylindrical sleeve 302. An example of non-shrinking cement is commercially available from Sauereisen Cements Co., Pittsburgh, Pa.

FIGS. 4A and 4B are intended to illustrate a representative embodiment of storage vessel 300, which provides: (1) adequate strength to withstand high pressures, such as pressures ranging from about 3000 psi to about 4000 psi; (2) seals that are resistant to hydrogen permeation at temperatures between about 77 K and room temperature of about 300° K, such as sodium silicate, potassium silicate and lithium silicate, combinations thereof and Kovar; and (3) materials that are resistant to hydrogen embrittlement, for example, metals that are resistant to hydrogen embrittlement can be chosen from the group for which hydrogen permeation is small. For example, even copper and aluminum show small hydrogen permeability at temperatures below 300° K. If desired, a metal with low permeability can be backed up by a metal with high permeability but with better structural strength.

EXAMPLES

The following examples best serve to illustrate the principles of the present invention and describe embodiments thereof. They are not to be construed as limiting the invention in any manner or to any precise form.

Example 1

Resorcinol-Formaldehyde RF of Interstitial Hydrogen Storage

A mix of resorcinol-formaldehyde sol-gel was created at 1 atm, which included 12.35 grams resorcinol in 17.91 grams of formaldehyde in 37% solvent and 5.6 grams sodium carbonate 1 M.

Next, the RF sol-gel was poured into a mold at 100% full where the sol-gel was infiltrated into highly porous reinforcing filler precursors, for example, carbon fibers, carbon felt, carbon paper, cellulose fibers or cotton fibers.

The RF sol-gel was oven cured in the sealed mold filled with carbon non-woven Grade 8000045 mat at 194° F. for 1 day.

During Oven Cure Polymerization the micropores (<2 nm), mesopores (2 nm-100 nm), and macropores (>100 nm), the three-dimensional reticulate organic gel framework extending throughout a liquid containing ionic metal salts in a solvent [S] was formed.

Next, the pore solvent was exchanged with a metal salt ionic solvent having the formula:

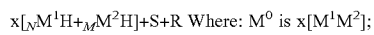

$x[_N M^1 H +_M M^2 H] + S + R$ Where: $M^0$ is $x[M^1 M^2]$;

where $M^1$ is Metals of Group VIII; $M^2$ is Metals of Group IB; H is $(NO_3^-, Cl^-,)$; S is solvent. Thus, $x[_N M^1 H +_M M^2 H] + S$ (ionic solvent). The gel can be exchanged with the ionic solvent for 1 day from its original solvent environment.

The gel was then carbonized to a metal alloy laded carbon aerogel at 1 atm by placing the gel in a CANCo reducing atmosphere furnace at a temperature of 1050° C. (1922° F.) in a reducing atmosphere of 100% Hydrogen $H_2$ [R], where: $x[_N M^1 H +_M M^2 H] + S$ is reduced to a metal alloy $x[1M^0 2M^0]$. The temperature in the CANCo furnace was then lowered to a temperature of 650° C. (1202° F.).

The CANCo furnace was then purged with an atmosphere of 50% Hydrogen $H_2$ and 50% Carbon Monoxide CO at 650° C. (1202° F.) for 4 hours to grow nanostructures in the catalyzed metal alloy carbon aerogel (Formula: $CO + H_2 \rightarrow C + H_2O\uparrow$). Then the temperature in the CANCo furnace was lowered to ambient temperature.

To keep the carbon aerogel form becoming contaminated, the aerogel was placed in a bagged filled with a nitrogen atmosphere during transporting and handling.

Next, the nanostructure laded carbon aerogel in the nitrogen atmosphere filled bag was loaded into the pressure vessel at ambient temperature and 1 atm.

Next, the carbon aerogel and nanostructures were cooled to about −195.8° C. (−320.4° F.) at 1 atm in the pressure vessel with using liquid nitrogen $N_2$.

The adsorption of Hydrogen $H_2$ occurred in the pressure vessel at a temperature of −195.8° C. (−320.4° F.) at 1 atm for a duration of 4 hours. Next, the pressure vessel was heated to ambient temperature and a pressure of about 204.1 atm (3000 psi) for 1-2 hours.

Example 2

Phenolic-Furfural (PF) of Interstitial Hydrogen Storage

Phenolic-furfural (PF) was mixed with a solvent at a pressure of 1 atm. The mixture included 10.0 grams Fur-Carb® UP520, 100 ml n-proponal, and 1.0 gram QUCORR® 2001. The PF sol-gel mixture was poured into a mold filled with Carbon nonwoven Grade 8000045 mat and sealed. The mold was placed into an oven where the PF sol-gel was cured at 194° F. for 1 day.

After curing, the PF sol-gel was exchanged with an ionic solvent for 1 day from its original solvent environment. In this example, the ionic solvent had the formula:

$x[_N M^1 H +_M M^2 H] + S + R$ where: $M^0$ is $x[M^1 M^2]$; $M^1$ is Metals of Group VIII; $M^2$ is Metals of Group IB; H is $(NO_3^-, Cl^-,)$; S is ionic solvent.

Next, the resulting gel was super critically dried in a vessel substantially similar to that described in FIG. 4A. The supercritical drying was conducted at temperatures between about 21° C. to about 250° C. (70° F.-482° F.) at a pressure of about 122.4 atm (1800 psi).

The mix of phenolic-furfural PF sol-gel solution was next poured into a pressure vessel mold (100% full), which had previously been flushed with nitrogen gas. The pressure vessel mold was then sealed and heated at a rate of about 4° C. (39.2° F.) per minute from a temperature of about 21° C. to about 250° C. (70°-482° F.) at a pressure of about 122.4 atm (1800 psi). The pressure vessel mold was then held at a temperature of about 250° C. (482° F.) and a pressure of 122.4 atm (1800 psi) for one hour. The pressure vessel mold was then vented to about 20 psig and held there until the aerogel cooled to room temperature.

The aerogel was carbonized in a CANCo Reducing Atmosphere Furnace at a temperature of about 1050° C. (1922° F.) in a reducing atmosphere of 100% Hydrogen $H_2$ [R], where: $x[_N M^1 H +_M M^2 H] + S$ is reduced to a metal alloy $x[1M^0 2M^0]$. Then the furnace temperature is lowered to about 650° C. (1202° F.).

Next, the CANCo furnace was purged with an atmosphere of 50% Hydrogen $H_2$ and 50% Carbon Monoxide CO at a temperature of about 650° C. (1202° F.) for 4 hours. In this environment, nanostructures are grown in the catalyzed metal alloy carbon aerogel (Formula: $CO + H_2 \rightarrow C + H_2O\uparrow$). Then, the furnace temperature is lowered to ambient temperature.

To avoid contamination during transport and handling, the carbon aerogel with the nanostructures is placed in a bag having a nitrogen atmosphere. The nanostructure laded carbon aerogel in the bag of nitrogen atmosphere was placed into the pressure vessel at ambient temperature and 1 atm.

Next, the carbon aerogel and nanostructures were cooled to about −195.8° C. (−320.4° F.) at 1 atm in the pressure vessel with using liquid nitrogen $N_2$.

The adsorption of Hydrogen $H_2$ occurred in the pressure vessel at a temperature of −195.8° C. (−320.4° F.) at 1 atm for a duration of 4 hours. Next, the pressure vessel was heated to ambient temperature and a pressure of about 204.1 atm (3000 psi) for 1-2 hours.

The resulting weight density was found to be >62 Kg/m³ of Hydrogen $H_2$ adsorption at ambient temperature.

Example 3

Phenolic-Furfural PF of Interstitial Hydrogen Storage

A phenolic-furfural mixture was created at 1 atm. The mixture included 13 grams FurCarb® UP520 in 86 ml methanol [S], and 1.5 gram Quacorr® 2001.

The PF sol-gel mixture and Metal Salt Compounds were poured into a glass jar mold (100% full) and sealed.

Next, the PF sol-gel and metal salt compounds were cured in the sealed glass jar mold for 4 days at a temperature of 85° C. (185° F.) at 1 atm pressure.

During the oven cure the micropores (<2 nm), mesopores (2 nm-100 nm), and macropores (>100 nm), and the three-dimensional reticulate organic gel framework extending throughout a liquid containing methanol [S] are formed.

Next, the pore solvent was exchanged with a metal salt ionic solvent having the formula:

$$x[_N M^1 H +_M M^2 H] + S + R \text{ Where: } M^0 \text{ is } x[M_1 M^2];$$ 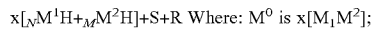

where $M^1$ is Metals of Group VIII; $M^2$ is Metals of Group IB; H is ($NO_3^-$, $Cl^-$,) S is solvent. The $x[_N M^1 H +_M M^2 H] + S$ (ionic solvent) is mixed. The gel was exchanged from its original solvent environment for 1 day.

The cured compounds were loaded into a container having a reducing agent [R] in methanol solvents [S] with the formula:

$$x[_N M^1 H +_M M^2 H] + S + R$$ 

where: $M^0$ is $x[Cu_3 Fe_7]$; $M^1$ is Metals of Group VIII; $M^2$ is Metals of Group IB; H is Halogen ($Cl^-$, $Br^-$, $F^-$, $I^-$); S is methanol solvent; R is Morpholine Borane (MPB) reducing agents; and x, $_M$ and $_N$ are integers.

The resulting compounds were supercritically dried in a pressure vessel substantially like that described with regard to FIG. 4A at temperatures between about 21° C. (70° F.) to about 250° C. (482° F.) at 122.4 atm (1800 psi).

After, flushing the pressure vessel mold with nitrogen gas, the mix of phenolic-furfural PF sol-gel solution is poured into the pressure vessel mold at 100% full and sealed. The pressure vessel mold is heated at a rate 4° C. (39.2° F.) per minute temperature inside the pressure vessel mold cavity from about 21° C. (70° F.) to about 250° C. (482° F.) at 122.4 atm (1800 psi). The pressure vessel mold cavity pressure and temperature are then held at about 250° C. (482° F.) at 122.4 atm (1800 psi) for one hour. The pressure vessel mold is then vented to about 20 psig and held until the aerogel is cooled to room temperature.

Next, the metal compound laded organic aerogel was loaded at 1 atm into a CANCo Furnace.

The organic aerogel was carbonized to a metal alloy laded carbon aerogel at 1 atm in the CANCo reducing inert atmosphere furnace at a temperature of 1050° C. (1922° F.) in an reducing atmosphere of 100% Hydrogen $H_2$ [R]. Then, the CANCo Furnace temperature was lowered to 650° C. (1202° F.).

The CANCo furnace was purged with an atmosphere of 50% Hydrogen $H_2$ and 50% Carbon Monoxide CO at 650° C. (1202° F.) for 4 hours. The growing of nanostructures in catalyzed metal alloy carbon aerogel was accomplished using $CO + H_2 \rightarrow C + H_2 O\uparrow$); and then the temperature in the CANCo Furnace was lowered to ambient temperature. The compound was placed in a nitrogen atmosphere bag during handling and transporting.

The nanostructure laded carbon aerogel bagged in the nitrogen atmosphere was loaded into the pressure vessel at ambient temperature and at 1 atm.

Next, the carbon aerogel and nanostructures were cooled to about −195.8° C. (−320.4° F.) at 1 atm in the pressure vessel with using liquid nitrogen $N_2$.

The adsorption of Hydrogen $H_2$ occurred in the pressure vessel at a temperature of −195.8° C. (−320.4° F.) at 1 atm for a duration of 4 hours. Next, the pressure vessel was heated to ambient temperature and a pressure of about 204.1 atm (3000 psi) for 1-2 hours.

Example 4

Phenolic-Furfural PF of Interstitial Hydrogen Storage

A phenolic-furfural mixture was created at 1 atm. The mixture included 13 grams FurCarb® UP520 in 86 ml methanol [S], and 1.5 gram Quacorr® 2001.

Next, mix the PF mixture with a metal salt: $x[_N M^1 H +_M M^2 H] + S$ Compounds, such as $x[3CuCl_2 + 7FeCl_2 + S]$, to PF SOL-GEL, where: $M^0$ is $x[M^1 M^2]$; $M^1$ is Metals of Group VIII; $M^2$ is Metals of Group IB; H is ($NO_3^-$, $Cl^-$); S is solvent.

Next, the PF sol-gel and metal salt compounds were cured in the sealed glass jar mold for 4 days at a temperature of 85° C. (185° F.) at 1 atm pressure.

During the oven cure the micropores (<2 nm), mesopores (2 nm-100 nm), and macropores (>100 nm), and the three-dimensional reticulate organic gel framework extending throughout a liquid containing methanol [S] are formed.

Next, the pore solvent was exchanged with a metal salt ionic solvent having the formula:

$$x[_N M^1 H +_M M^2 H] + S + R \text{ Where: } M^0 \text{ is } x[M^1 M^2];$$ 

where $M^1$ is Metals of Group VIII; $M^2$ is Metals of Group IB; H is ($NO_3^-$, $Cl^-$,); S is solvent. The $x[_N M^1 H +_M M^2 H] + S$ (ionic solvent) is mixed. The gel was exchanged from its original solvent environment for 1 day.

Next, the cured compounds were loaded in a container containing a reducing agent [R] in a methanol solvent [S] having the formula: $x[_N M^1 H +_M M^2 H] + S + R$, where: $M^0$ is $x[Cu_3 Fe_7]$; $M^1$ is Metals of Group VIII; $M^2$ is Metals of Group IB; H is Halogen ($Cl^-$, $Br^-$, $F^-$, $I^-$); S is methanol solvent; R is morpholine borane (MPB) reducing agents; and x, $_M$ and $_N$ are integers.

The resulting compounds were supercritically dried using liquid carbon dioxide in a pressure vessel substantially like that described with regard to FIG. 4A at temperatures between about 32° C. (89.6°) and about 40° C. (104° F.) at 81.6 atm (1200 psi).

The PF aerogel and metal compounds were cooled for 1 day at 10° C. (50° F.) in a pressure vessel. Next, the pressure vessel was pressurized with liquid carbon dioxide $CO_2$ at 54.4 atm (800 psi) while at 10° C. (50° F.).

The sol-gel methanol solvent was exchanged with liquid carbon dioxide $CO_2$ in the pressure vessel. The pressure vessel pressurized to 81.6 atm (1200 psi) at a temperature between about 32° C. (89.6°) and 40° C. (104° F.).

The CO₂ gas was slowly vented from the pressure vessel to 2 atm.

Next, the metal compound laded organic aerogel was loaded at 1 atm into a CANCo Furnace.

The organic aerogel was carbonized to a metal alloy laded carbon aerogel at 1 atm in the CANCo reducing inert atmosphere furnace at a temperature of 1050° C. (1922° F.) in an reducing atmosphere of 100% Hydrogen $H_2$ [R]. Then, the CANCo Furnace temperature was lowered to 650° C. (1202° F.).

The CANCo furnace was purged with an atmosphere of 50% Hydrogen $H_2$ and 50% Carbon Monoxide CO at 650° C. (1202° F.) for 4 hours. The growing of nanostructures in catalyzed metal alloy carbon aerogel was accomplished using $CO+H_2 \rightarrow C+H_2O\uparrow$); and then the temperature in the CANCo Furnace was lowered to ambient temperature. The compound was placed in a nitrogen atmosphere bag during handling and transporting.

The nanostructure laded carbon aerogel bagged in the nitrogen atmosphere was loaded into the pressure vessel at ambient temperature and at 1 atm.

Next, the carbon aerogel and nanostructures were cooled to about −195.8° C. (−320.4° F.) at 1 atm in the pressure vessel with using liquid nitrogen $N_2$ The adsorption of Hydrogen $H_2$ occurred in the pressure vessel at a temperature of −195.8° C. (−320.4° F.) at 1 atm for a duration of 4 hours. Next, the pressure vessel was heated to ambient temperature and a pressure of about 204.1 atm (3000 psi) for 1-2 hours.

Approximations are made in estimating the parameters involved in the hydrogen storage so that predictions of hydrogen storage capacity are only representative of the order of magnitudes that may be achieved. The overall conclusions are not appreciably affected by the approximations.

Having thus described the preferred embodiments, persons skilled in the art will recognize that changes may be made in form and detail without departing from the spirit and scope of the invention. Thus the invention is limited only by the following claims.

What is claimed is:

1. A gas storage apparatus comprising:
   a pressure vessel including:
   a polymeric structure of interconnected particles creating open cells;
   a nanostructure grown on said polymeric structure, said polymeric structure and said nanostructure capable of sorbing a molecular gas; and
   a catalyst disposed on said polymeric structure bonded to carboxyl sites disposed on said polymeric structure to form catalyst islands;
   wherein said nanostructure is configured to be grown from said catalyst islands.

2. The apparatus of claim 1, wherein said nanostructure comprises a structure taken from the group consisting of platelet carbon nano-fiber, cylindrical carbon nanostructure, ribbon carbon nano-fiber, faceted tubular carbon nano-fiber and herringbone carbon nano-fiber.

3. The apparatus of claim 1, wherein said polymeric structure of interconnected particles creating open cells comprises particles having a diameter of up to 100 Angstroms.

4. The apparatus of claim 1, wherein said polymeric structure of interconnected particles creating open cells comprises a polymeric structure formed from a solution of one of either formaldehyde-resorcinol (RF) or phenolic-furfural (PF).

5. The apparatus of claim 1, wherein said polymeric structure of interconnected particles creating open cells comprises a carbon aerogel structure having a density of about the order of 100 mg/cc.

6. The apparatus of claim 1, wherein said polymeric structure of interconnected particles creating open cells comprises a carbon aerogel structure having a surface area in the range of between about 0.2 $m^2$/gm and 3000 $m^2$/gm.

7. The apparatus of claim 1, wherein said molecular gas is taken from the group consisting of hydrogen and oxygen.

8. The apparatus of claim 1, wherein said polymeric structure comprises a catalyzed carbon aerogel monolith structure.

9. The apparatus of claim 1, wherein said nanostructure comprises solid fibers or hollow tubes of carbon.

10. The apparatus of claim 1, wherein said open cells range in size up to about 1000 Angstroms.

11. The apparatus of claim 1, wherein said deposited catalyst is taken from a group of transition metals consisting of Sc, Ti, V, Cr, Mn, Fe, Co, Ni, Cu, Zn and combinations thereof.

12. The apparatus of claim 1, wherein said deposited catalyst comprises an alloy of 70% Fe and 30% Cu.

13. The apparatus of claim 1, wherein said nanostructure is configured to be grown from said catalyst islands by preparing graphite nano-filaments by the decomposition of an effective amount of carbon-containing gas mixture precursors on said polymeric structure at an elevated temperature.

14. The apparatus of claim 13, wherein said elevated temperature is in the range of between about 500° F. and about 2000° F.

15. The apparatus of claim 13, wherein said carbon-containing gas mixture comprises gases taken from the group consisting of acetylene, benzene, carbon dioxide, carbon monoxide, hydrogen, and methane.

16. The apparatus of claim 1, wherein said pressure vessel is configured to receive said molecular gas at a temperature of between about 77° K and about 300° K.

* * * * *